United States Patent
Comb et al.

(10) Patent No.: US 9,770,869 B2
(45) Date of Patent: Sep. 26, 2017

(54) ADDITIVE MANUFACTURING WITH VIRTUAL PLANARIZATION CONTROL

(71) Applicant: Stratasys, Inc., Eden Prairie, MN (US)

(72) Inventors: James W. Comb, Hamel, MN (US); Zeiter S. Farah, Minneapolis, MN (US); J. Samuel Batchelder, Somers, NY (US)

(73) Assignee: Stratasys, Inc., Eden Prairie, MN (US)

( * ) Notice: Subject to any disclaimer, the term of this patent is extended or adjusted under 35 U.S.C. 154(b) by 530 days.

(21) Appl. No.: 14/218,084

(22) Filed: Mar. 18, 2014

(65) Prior Publication Data

US 2015/0266242 A1   Sep. 24, 2015

(51) Int. Cl.
*B29C 67/00* (2017.01)
*G03G 15/22* (2006.01)
*B33Y 10/00* (2015.01)
*B33Y 30/00* (2015.01)
*B33Y 50/02* (2015.01)

(52) U.S. Cl.
CPC ...... *B29C 67/0088* (2013.01); *B29C 67/0055* (2013.01); *G03G 15/224* (2013.01); *B33Y 10/00* (2014.12); *B33Y 30/00* (2014.12); *B33Y 50/02* (2014.12)

(58) Field of Classification Search
CPC ............ B29C 67/0077; B29C 67/0074; G03G 15/224
USPC ..... 425/174.4, 375; 264/308, 401, 494, 40.1
See application file for complete search history.

(56) References Cited

U.S. PATENT DOCUMENTS

| | | | |
|---|---|---|---|
| 2,297,691 | A | 10/1942 | Carlson |
| 4,988,602 | A | 1/1991 | Jongewaard et al. |
| 5,088,047 | A | 2/1992 | Bynum |
| 5,099,288 | A | 3/1992 | Britto et al. |
| 5,254,421 | A | 10/1993 | Coppens et al. |
| 5,345,391 | A * | 9/1994 | Hull .................... B29C 67/0062 156/273.3 |
| 5,354,414 | A | 10/1994 | Feygin |

(Continued)

FOREIGN PATENT DOCUMENTS

| | | |
|---|---|---|
| CN | 101310964 A | 11/2008 |
| DE | 4135971 A1 | 5/1993 |

(Continued)

OTHER PUBLICATIONS

International Search Report and Written Opinion dated Jun. 1, 2015, for corresponding International Application No. PCT/US2015/017968, filed Feb. 27, 2015.

(Continued)

*Primary Examiner* — Nahida Sultana
(74) *Attorney, Agent, or Firm* — Peter J. Ims; Westman, Champlin & Koehler, P.A.

(57) ABSTRACT

A method and system for printing a three-dimensional part, which includes printing a plurality of successive layers of the three-dimensional part with the additive manufacturing system based on bitslices in a bitslice stack, measuring surface heights of the successive layers after each of the successive layers are printed, determining differences between the measured surface heights and predicted stack heights of the bitslices, identifying one or more topographical error regions based on the determined differences, and modifying the bitslice stack to compensate for the one or more topographical error regions.

14 Claims, 12 Drawing Sheets

(56) References Cited

U.S. PATENT DOCUMENTS

| | | | |
|---|---|---|---|
| 5,354,799 A | 10/1994 | Bennett et al. | |
| 5,514,232 A | 5/1996 | Burns | |
| 5,592,266 A | 1/1997 | Park et al. | |
| 5,593,531 A | 1/1997 | Penn | |
| 5,594,652 A | 1/1997 | Penn et al. | |
| 5,866,058 A | 2/1999 | Batchelder et al. | |
| 5,981,616 A | 11/1999 | Yamamura et al. | |
| 5,990,268 A | 11/1999 | Dickens, Jr. et al. | |
| 6,052,551 A | 4/2000 | De Cock et al. | |
| 6,066,285 A | 5/2000 | Kumar | |
| 6,169,605 B1 | 1/2001 | Penn et al. | |
| 6,193,923 B1* | 2/2001 | Leyden | B29C 41/12 264/308 |
| 6,206,672 B1 | 3/2001 | Grenda | |
| 6,329,115 B1 | 12/2001 | Yamashita | |
| 6,376,148 B1 | 4/2002 | Liu et al. | |
| 6,492,651 B2 | 12/2002 | Kerekes | |
| 6,509,128 B1 | 1/2003 | Everaerts et al. | |
| 6,531,086 B1 | 3/2003 | Larsson | |
| 6,780,368 B2 | 8/2004 | Liu et al. | |
| 6,799,959 B1 | 10/2004 | Tochimoto et al. | |
| 6,815,636 B2 | 11/2004 | Chung et al. | |
| 6,887,640 B2 | 5/2005 | Zhang et al. | |
| 7,011,783 B2 | 3/2006 | Fong | |
| 7,077,638 B2 | 7/2006 | Leyden et al. | |
| 7,208,257 B2 | 4/2007 | Cheng et al. | |
| 7,261,541 B2 | 8/2007 | Fong | |
| 7,261,542 B2 | 8/2007 | Hickerson et al. | |
| 7,291,242 B2 | 11/2007 | Khoshnevis | |
| 7,435,763 B2 | 10/2008 | Farr et al. | |
| 7,790,093 B2* | 9/2010 | Shkolnik | B29C 67/007 264/401 |
| 7,815,826 B2 | 10/2010 | Serdy et al. | |
| 7,892,474 B2* | 2/2011 | Shkolnik | B29C 67/0055 264/401 |
| 7,988,906 B2 | 8/2011 | Monsheimer et al. | |
| 8,047,251 B2 | 11/2011 | Khoshnevis | |
| 8,119,053 B1 | 2/2012 | Bedal et al. | |
| 8,123,999 B2 | 2/2012 | Priedeman, Jr. et al. | |
| 8,124,192 B2 | 2/2012 | Paasche et al. | |
| 8,147,910 B2 | 4/2012 | Kritchman | |
| 8,173,258 B2 | 5/2012 | Monsheimer et al. | |
| 8,216,757 B2 | 7/2012 | Mizutani et al. | |
| 8,221,671 B2 | 7/2012 | Hull et al. | |
| 8,246,888 B2 | 8/2012 | Hopkins et al. | |
| 8,249,480 B2 | 8/2012 | Aslam et al. | |
| 8,323,017 B2* | 12/2012 | Kritchman | B29C 67/0059 264/308 |
| 8,459,280 B2 | 6/2013 | Swanson et al. | |
| 8,845,316 B2* | 9/2014 | Schillen | B29C 67/0051 425/135 |
| 2002/0093115 A1 | 7/2002 | Jang et al. | |
| 2002/0145213 A1 | 10/2002 | Liu et al. | |
| 2003/0087176 A1 | 5/2003 | Ezenyilimba et al. | |
| 2004/0173946 A1 | 9/2004 | Pfeifer et al. | |
| 2004/0232583 A1 | 11/2004 | Monsheimer et al. | |
| 2005/0207801 A1 | 9/2005 | Kunii et al. | |
| 2005/0218549 A1 | 10/2005 | Farr et al. | |
| 2008/0032083 A1 | 2/2008 | Serdy et al. | |
| 2008/0169585 A1 | 7/2008 | Zinniel | |
| 2008/0169589 A1 | 7/2008 | Sperry et al. | |
| 2008/0171284 A1 | 7/2008 | Hull et al. | |
| 2008/0226346 A1 | 9/2008 | Hull et al. | |
| 2009/0236775 A1 | 9/2009 | Monsheimer et al. | |
| 2011/0117485 A1 | 5/2011 | Hermann et al. | |
| 2011/0186081 A1 | 8/2011 | Dunn et al. | |
| 2011/0190446 A1 | 8/2011 | Matsui et al. | |
| 2012/0041132 A1 | 2/2012 | Monsheimer et al. | |
| 2012/0139167 A1 | 6/2012 | Fruth et al. | |
| 2012/0201960 A1 | 8/2012 | Hartmann et al. | |
| 2012/0202012 A1 | 8/2012 | Grebe et al. | |
| 2012/0237870 A1 | 9/2012 | Watanabe et al. | |
| 2012/0263488 A1 | 10/2012 | Aslam et al. | |
| 2012/0274002 A1 | 11/2012 | Uchida | |
| 2013/0077996 A1 | 3/2013 | Hanson et al. | |
| 2013/0077997 A1 | 3/2013 | Hanson et al. | |
| 2013/0171434 A1 | 7/2013 | Hirth et al. | |
| 2013/0186549 A1 | 7/2013 | Comb et al. | |
| 2013/0186558 A1 | 7/2013 | Comb et al. | |
| 2014/0004462 A1 | 1/2014 | Zaretsky | |
| 2014/0070461 A1 | 3/2014 | Pax | |
| 2014/0167326 A1 | 6/2014 | Jones et al. | |
| 2016/0224017 A1* | 8/2016 | Huang | B22F 3/1055 |

FOREIGN PATENT DOCUMENTS

| | | | |
|---|---|---|---|
| EP | 0712051 A2 | 5/1996 | |
| EP | 0879693 A1 | 11/1998 | |
| GB | 2446386 A | 8/2008 | |
| JP | 5165350 A | 7/1993 | |
| JP | 8281808 A | 10/1996 | |
| JP | 2001075376 A | 3/2001 | |
| JP | 2002347129 A | 12/2002 | |
| JP | 2003053849 A | 2/2003 | |
| JP | 2003071940 A | 3/2003 | |
| JP | 2005062860 A | 3/2005 | |
| JP | 2006182813 A | 7/2006 | |
| WO | 9851464 A1 | 11/1998 | |
| WO | 2004024447 A2 | 3/2004 | |
| WO | 2007114895 A2 | 10/2007 | |
| WO | 2011065920 A1 | 6/2011 | |
| WO | 2012034666 A1 | 3/2012 | |

OTHER PUBLICATIONS

"Xerography", Aug. 27, 2010, pp. 1-4, http:/en.wikipedia.org/wiki/Xerography.

Jones, Jason, "Selective Laser Printing", Published Prior to Jan. 14, 2013, 1 page.

* cited by examiner

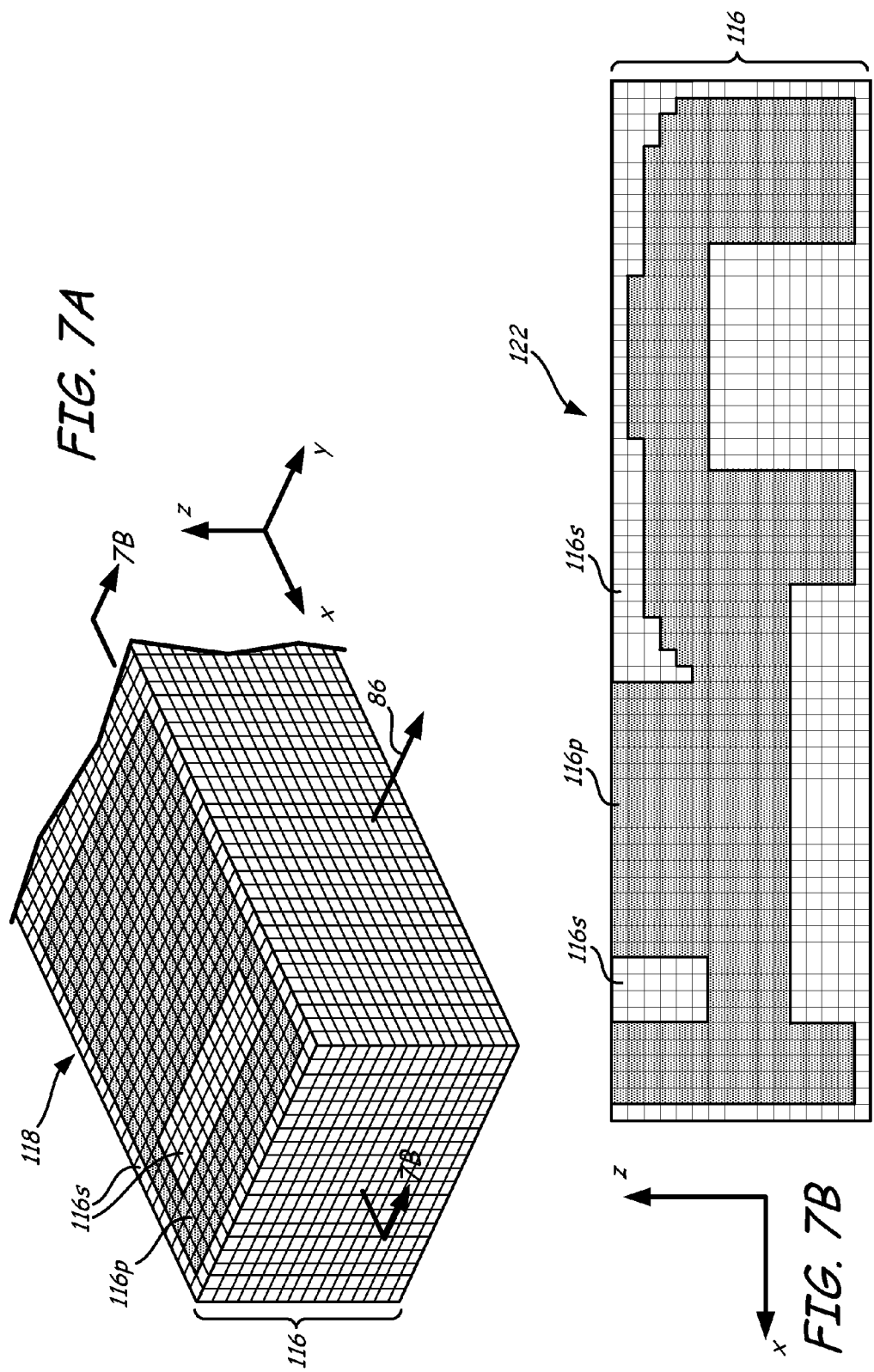

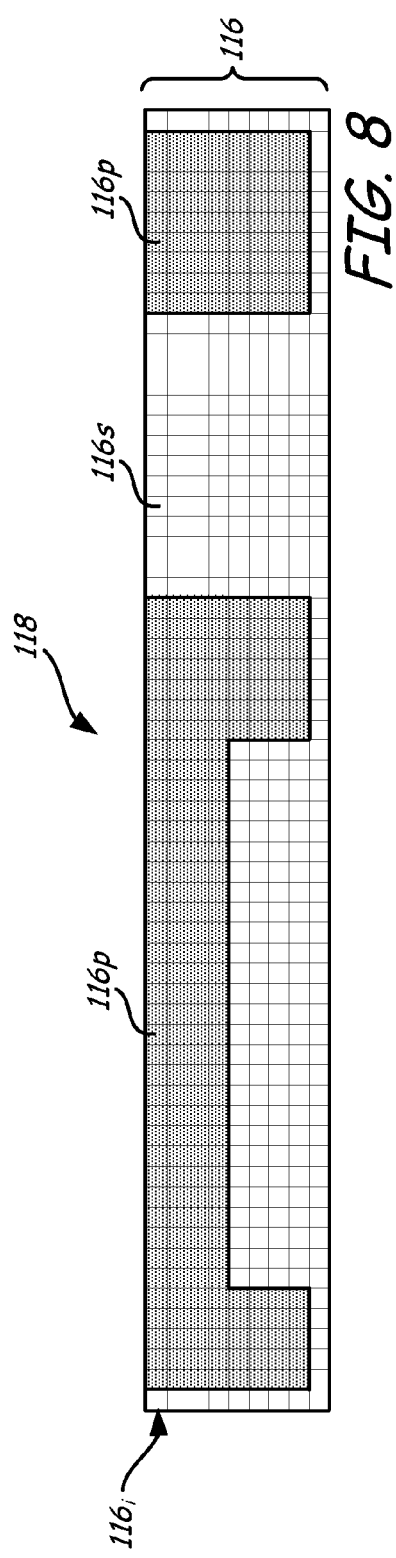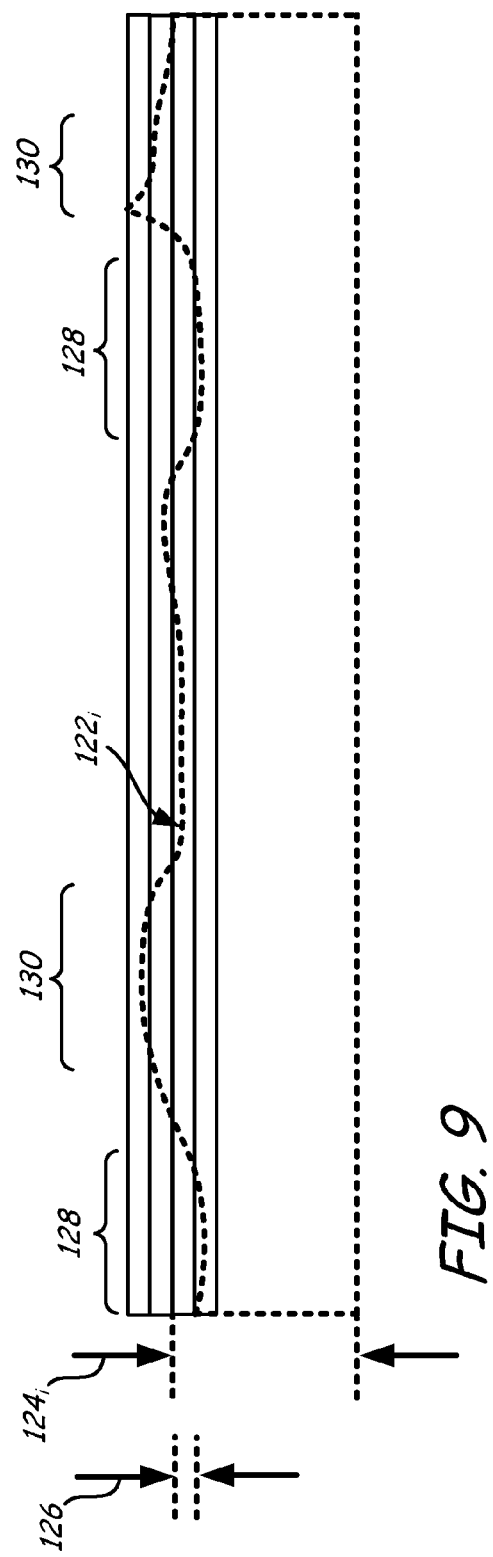

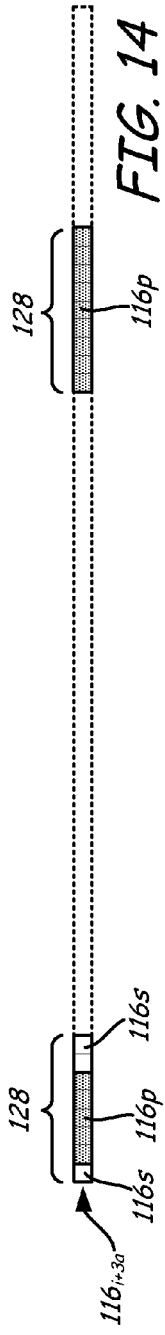
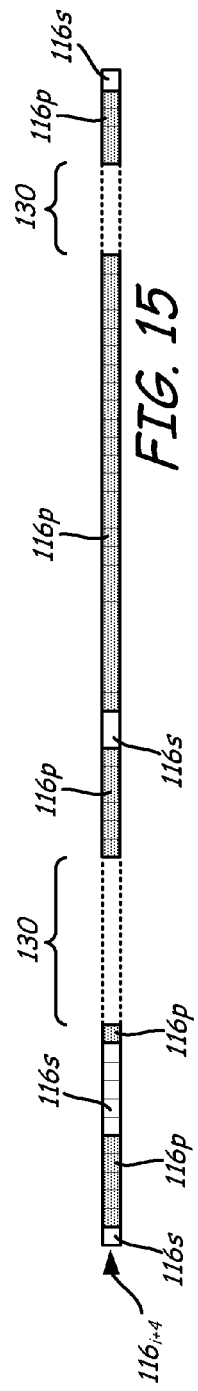
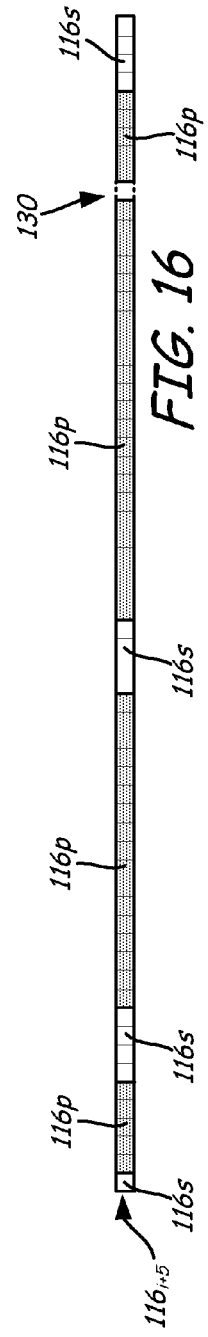
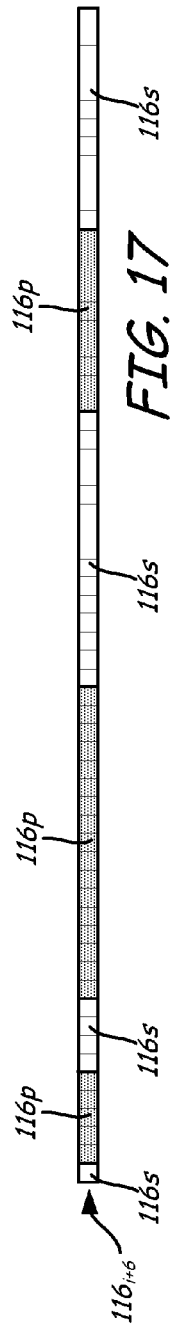

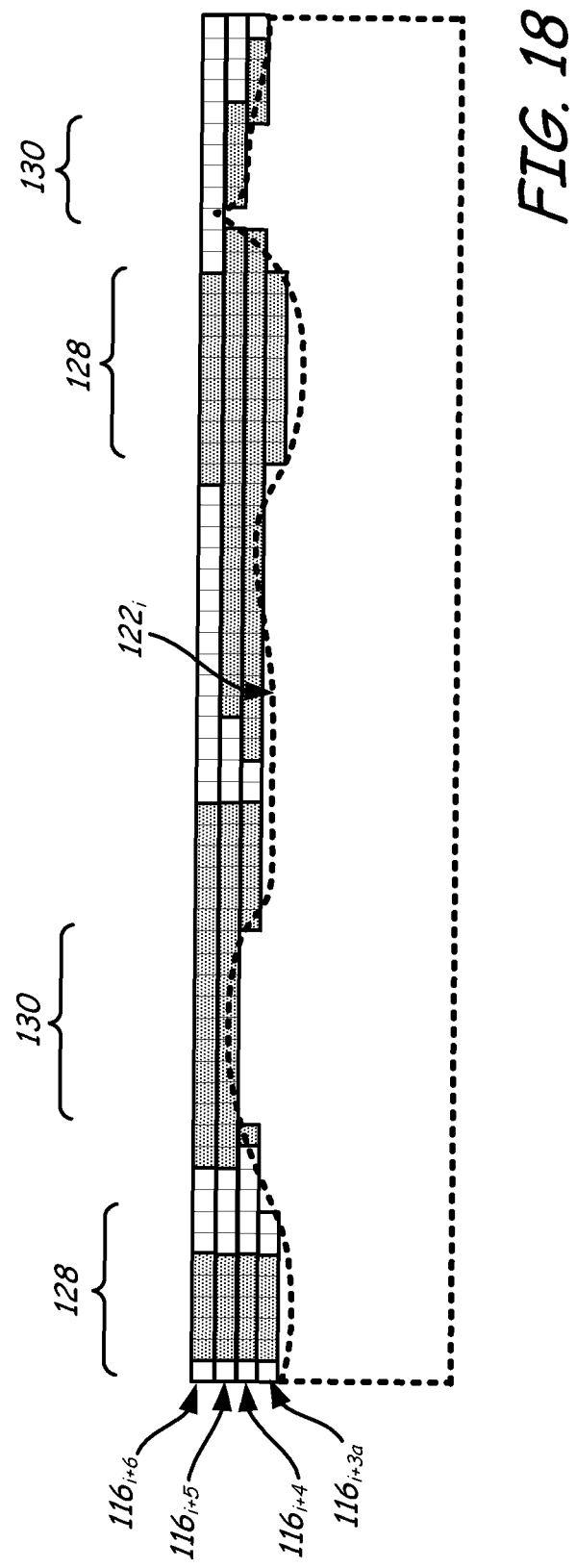

ADDITIVE MANUFACTURING WITH VIRTUAL PLANARIZATION CONTROL

BACKGROUND

The present disclosure relates to additive manufacturing systems and processes for printing three-dimensional (3D) parts and support structures. In particular, the present disclosure relates to planarization controls for additive manufacturing systems and processes.

Additive manufacturing systems (e.g., 3D printers) are used to build 3D parts from digital representations of the 3D parts (e.g., AMF and STL format files) using one or more additive manufacturing techniques. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to form the given layer.

For example, in an extrusion-based additive manufacturing system, a 3D part or model may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed, and in some cases, for the sidewalls of the 3D part being formed. The support material adheres to the part material during fabrication, and is removable from the completed 3D part when the printing process is complete.

In two-dimensional (2D) printing, electrophotography (i.e., xerography) is a technology for creating 2D images on planar substrates, such as printing paper and transparent substrates. Electrophotography systems typically include a conductive support drum coated with a photoconductive material layer, where latent electrostatic images are formed by electrostatic charging, followed by image-wise exposure of the photoconductive layer by an optical source. The latent electrostatic images are then moved to a developing station where toner is applied to charged areas, or alternatively to discharged areas of the photoconductive insulator to form visible images. The formed toner images are then transferred to substrates (e.g., printing paper) and affixed to the substrates with heat and/or pressure.

SUMMARY

An aspect of the present disclosure is directed to a method for printing a 3D part with an additive manufacturing system. The method includes providing a bitslice stack having a plurality of bitslices, and printing a plurality of successive layers of the 3D part with the additive manufacturing system based on the bitslices in the bitslice stack. The method also includes measuring surface heights of the successive layers after each of the successive layers are printed, determining differences between the measured surface heights and predicted stack heights of the bitslices, identifying one or more topographical error regions (e.g., underfilled and/or overfilled regions) based on the determined differences, and modifying the bitslice stack to compensate for the one or more topographical error regions.

Another aspect of the present disclosure is directed to a method for printing a 3D part with an additive manufacturing system, which includes providing a bitslice stack having a plurality of bitslices, and developing a first layer with one or more electrophotography engines of the additive manufacturing system based on a first bitslice of the plurality of bitslices. The method also includes transfusing the developed first layer to a previous layer of the 3D part, and measuring surface heights of the transfused first layer, where one or more additional layers are developed with the one or more imaging engines prior to measuring the surface heights of the transfused first layer to provide a multiple-layer feedback delay. The method further includes determining differences between the measured surface heights and a predicted stack height of the first bitslice, and modifying the bitslice stack based on the determined differences and the multiple-layer feedback delay.

Another aspect of the present disclosure is directed to an additive manufacturing system for printing a 3D part, which includes one or more devices for printing layers of the 3D part based on a bitslice stack of bitslices. The system also includes one or more sensors configured to measure surface heights of the printed layers, and to transmit signals relating to the measured surface heights. The system further includes a controller assembly configured to receive the transmitted signals, to compare the measured surface heights of the received signals to predicted stack heights of the bitslices, and to modify the bitslice stack to compensate for differences between the measured surface heights and the predicted stack heights.

DEFINITIONS

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

BRIEF DESCRIPTION OF THE DRAWINGS

FIG. 7A is a perspective illustration of an example bitslice stack of multiple bitslices.

FIG. 7B is a two-dimensional portion of the example bitslice stack shown in FIG. 7A, taken along Section 7B-7B in FIG. 7A.

FIG. 8 is an illustration of a lower section of the two-dimensional portion shown in FIG. 7B, illustrating the bitslice stack after a given number of layers have been developed and printed.

FIG. 9 is an illustration of a composite z-height image being compared to bitslice increments for identifying underfilled and overfilled regions.

FIG. 14 is an illustration of a generated and introduced bitslice to compensate for underfilled regions.

FIGS. 15-17 are illustrations of modified bitslices to compensate for overfilled regions.

FIG. 18 is an illustration of the collectively generated and modified bitslices shown in FIGS. 14-17 in reference to the composite z-height image.

DETAILED DESCRIPTION

Figure 1:
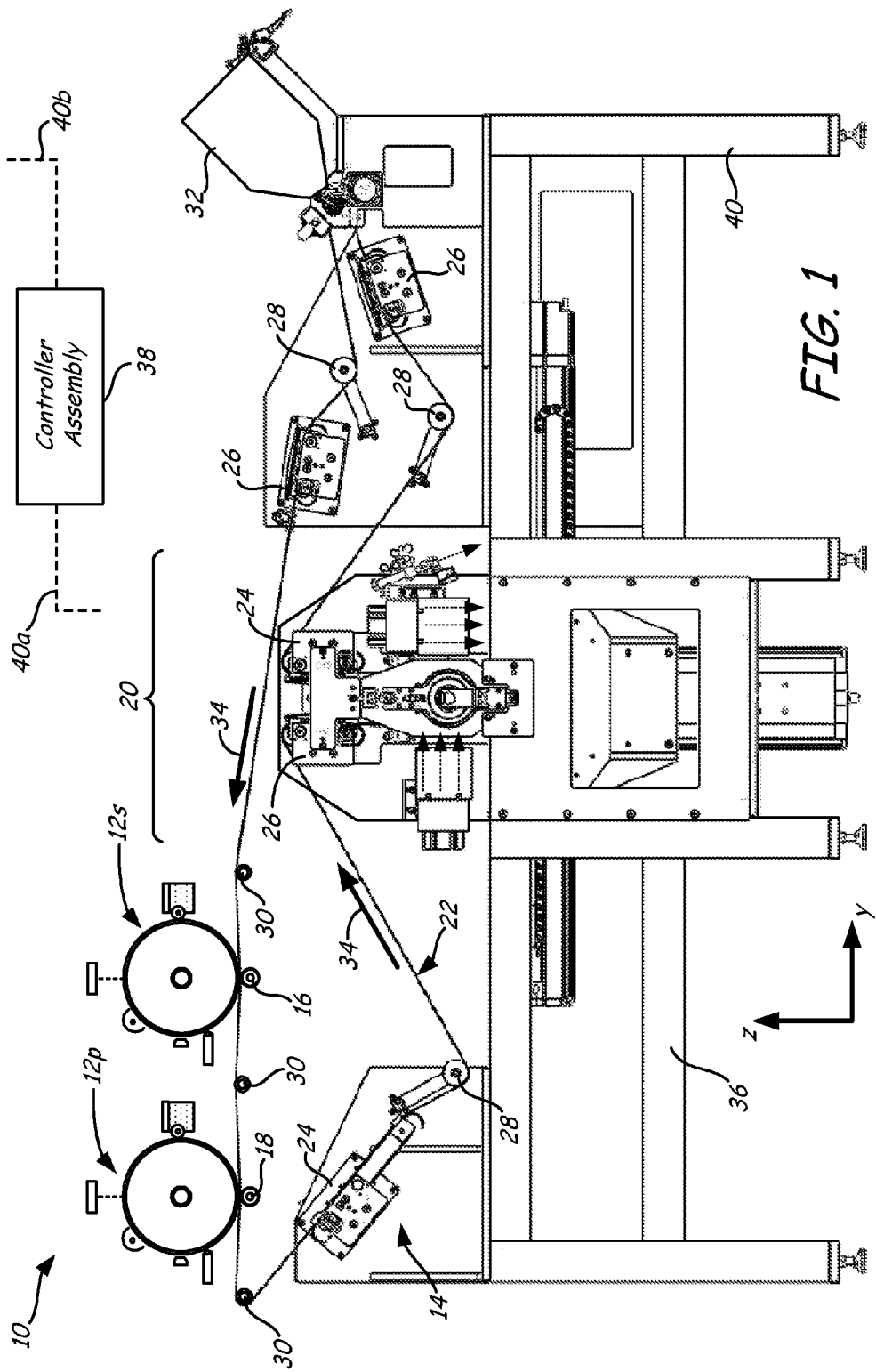
FIG. 1 is a front view of an example electrophotography-based additive manufacturing system for printing 3D parts and support structures with the use of the virtual planarization control of the present disclosure.

The present disclosure is directed to a process for virtually planarizing 3D parts and support structures to improve dimensional accuracies while printing with an additive manufacturing or 3D printing system. The virtual planarizing discussed herein is particularly suitable for use with electrophotography-based additive manufacturing systems, but may also be used with any suitable image-based additive manufacturing system, such as a jetting-based additive manufacturing system.

During an electrophotography printing operation, one or more electrophotography (EP) engines may develop or otherwise image each layer of part and support materials using an electrophotographic process. The developed layers are then transferred to a layer transfusion assembly where they are transfused (e.g., using heat and/or pressure) to print one or more 3D parts and support structures in a layer-by-layer manner.

As can be appreciated, due to the high resolutions and fast printing speeds, process variations can occur throughout the various stages of the printing operation, such as variations in the triboelectric charge-to-mass (Q/M) ratios and mass per unit area (M/A) values for the developed layers, edge lifting of the printed layers, interference by the interfaces of the part and support materials, part accumulation rate errors, thermal effects at the layer transfusion assembly, potential warping and curling issues, and the like.

These process variations can cumulatively prevent the part and support materials from being printed in precisely the correct amounts and at precisely the correct locations. In addition to potential x-y overlay issues, these process variations can produce printed layers that have topographical error regions, such as hills, valleys, slopes, and the like, which can deviate from the predicted layer heights.

One potential solution to these z-height variations involves physically planarizing the printed layers, such as with a knife-edge planarizer. Physical planarizing is a mechanical process of normalizing the intermediate build surface of a 3D part so that the physical surface corresponds to the layered mathematical model used to drive the printing process. Physical planarizing is conventionally necessary in many 3D printing applications because of the above-discussed process variations. However, physical planarizing can also introduce numerous complexities to the system, such as increased part and support material waste, waste material removal, increased hardware costs, and reduced printing speeds.

As such, the system of the present disclosure is uniquely controlled to virtually planarize 3D parts and support structures through the use of feedback controls, as discussed below. Briefly, the system includes one or more devices to print successive layers of the 3D parts and support structures, such as one or more EP engines, transfer assemblies, and layer transfusion assemblies. Each layer is printed from an associated digital bitslice, where the collection of bitslices make up a bitslice stack.

As used herein, the term "bitslice stack" is used to refer to a frame sequence for transmitting the individual bitslices in the bitslice stack to the printing devices (e.g., to the EP engines) in a sequential manner. The term "bitslice stack" is not limited to any particular "stacking" of the bitslices in adjacent data arrays on a computer storage media. Because increment or thickness of each bitslice in the bitslice stack is known (and preferably the same for each bitslice), each bitslice accordingly has a predicted stack height based on its location in the frame sequence. For instance, the first bitslice in the bitslice stack (corresponding to the first printed layer) may have a predicted stack height H, the second bitslice in the bitslice stack may have a predicted stack height 2H, the third bitslice in the bitslice stack may have a predicted stack height 3H, and so on.

The system includes one or more sensors that measure surface heights of the printed layers, from which a z-height composite image of each measured layer is generated. A controller assembly then compares the surface heights from the composite image for each printed layer to the predicted stack height of the associated bitslice to identify one or more topographical error regions, such as one or more underfilled regions, one or more overfilled regions, and combinations thereof. The controller assembly may then modify the bitslice stack to compensate for these topographical error regions. As discussed below, this feedback control virtually planarizes the printed 3D part and support structure to improve their dimensional accuracies, while also reducing or precluding the need for a physical planarizer.

FIGS. 1-4 illustrate system 10, which is an example electrophotography-based additive manufacturing system for printing 3D parts from a part material, and associated support structures from a support material, and is designed to virtually planarize the 3D parts and support structures during the printing operations. As shown in FIG. 1, system 10 includes a pair of EP engines 12$p$ and 12$s$, belt transfer assembly 14, biasing mechanisms 16 and 18, and layer transfusion assembly 20. Examples of suitable components and functional operations for system 10 include those disclosed in Hanson et al., U.S. Publication Nos. 2013/0077996 and 2013/0077997, and in Comb et al., U.S. Publication Nos. 2013/0186549 and 2013/0186558.

EP engines 12$p$ and 12$s$ are imaging engines for respectively imaging or otherwise developing layers of the part and support materials from associated digital bitslices. As discussed below, the imaged layers may then be transferred to belt transfer assembly 14 (or other transfer medium) with biasing mechanisms 16 and 18, and carried to layer transfusion assembly 20 to print the 3D parts and associated support structures in a layer-by-layer manner.

In the shown embodiment, belt transfer assembly 14 includes transfer belt 22, belt drive mechanisms 24, belt drag mechanisms 26, loop limit sensors 28, idler rollers 30, and belt cleaner 32, which are configured to maintain tension on belt 22 while belt 22 rotates in the rotational direction of arrows 34. In particular, belt drive mechanisms 24 engage and drive belt 22, and belt drag mechanisms 26 may function as brakes to provide a service loop design for protecting belt 22 against tension stress, based on monitored readings via loop limit sensors 28.

The components of system 10 may be retained by one or more frame structures, such as frame 36. Additionally, the components of system 10 are preferably retained within an enclosable housing (not shown) that prevents ambient light from being transmitted to the components of system 10 during operation.

System 10 also includes controller assembly 38, which is one or more computer-based systems configured to operate the components of system 10. Controller assembly 38 may communicate over communication line 40$a$ with the various components of system 10, such as EP engines 12$p$ and 12$s$, belt transfer assembly 14, biasing mechanisms 16 and 18, layer transfusion assembly 20, and various sensors, calibration devices, display devices, and/or user input devices.

Additionally, controller assembly 38 may also communicate over communication line 40$b$ with external devices, such as other computers and servers over a network connection (e.g., a local area network (LAN) connection). While communication lines 40$a$ and 40$b$ are each illustrated as a single signal line, they may each include one or more electrical, optical, and/or wireless signal lines.

Preferably, the one or more computer-based systems of controller assembly 38 are internal to system 10, allowing a user to operate system 10 over a network communication line 40$b$, such as from an external computer in the same manner as a two-dimensional printer. Alternatively, controller assembly 38 may also include one or more external computer-based systems (e.g., desktop, laptop, server-based, cloud-based, tablet, mobile media device, and the like) that may communicate with the internal computer-based system(s) of controller assembly 38, as well as communicating over a network via communication line 40$b$. In this alternative embodiment, the processing functions of controller assembly 38 discussed below may be divided between the internal and external computer-based systems. In yet another alternative embodiment, the one or more computer-based systems of controller assembly 38 may all be located external to system 10 (e.g., one or more external computers), and may communicate with system 10 over communication line 40$a$.

Figure 2:
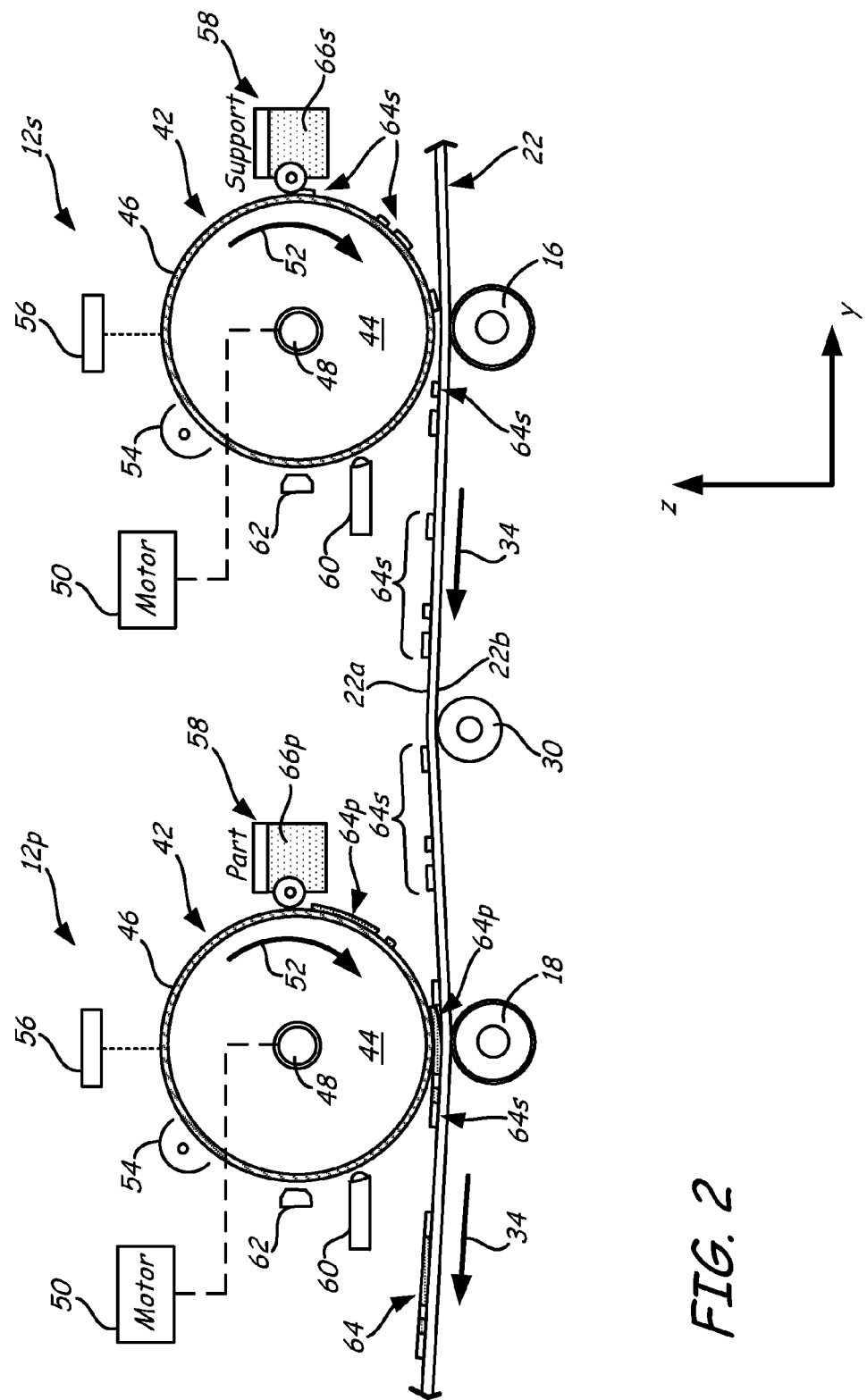
FIG. 2 is a schematic front view of a pair of electrophotography engines of the system for developing layers of the part and support materials.

FIG. 2 illustrates EP engines 12$p$ and 12$s$, where EP engine 12$s$ (i.e., the upstream EP engine relative to the rotational direction of belt 22) develops layers of the support material, and EP engine 12$p$ (i.e., the downstream EP engine relative to the rotational direction of belt 22) develops layers of the part material. In alternative embodiments, the arrangement of EP engines 12$p$ and 12$s$ may be reversed such that EP engine 12$p$ is upstream from EP engine 12$s$ relative to the rotational direction of belt 22. In further alternative embodiments, system 10 may include three or more EP engines for printing layers of additional materials (e.g., materials of different colors, opacities, and/or functional characteristics).

In the shown embodiment, EP engines 12$p$ and 12$s$ may include the same components, such as photoconductor drum 42 having conductive drum body 44 and photoconductive surface 46. Conductive drum body 44 is an electrically-conductive drum (e.g., fabricated from copper, aluminum, tin, or the like) that is electrically grounded and configured to rotate around shaft 48. Shaft 48 is correspondingly connected to drive motor 50, which is configured to rotate shaft 48 (and photoconductor drum 42) in the direction of arrow 52 at a constant rate.

Photoconductive surface 46 is a thin film extending around the circumferential surface of conductive drum body 44, and is preferably derived from one or more photoconductive materials, such as amorphous silicon, selenium, zinc oxide, organic materials, and the like. As discussed below, surface 46 is configured to receive latent-charged images of the sliced layers of the 3D part or support structure (or negative images), and to attract charged particles of the part or support material of the present disclosure to the charged or discharged image areas based on the Q/M ratios of the materials, thereby creating the layers of the 3D part or support structure.

As further shown, EP engines 12$p$ and 12$s$ also includes charge inducer 54, imager 56, development station 58, cleaning station 60, and discharge device 62, each of which may be in signal communication with controller assembly 38 over communication line 40$a$. Charge inducer 54, imager 56, development station 58, cleaning station 60, and discharge device 62 accordingly define an image-forming assembly for surface 46 while drive motor 50 and shaft 48 rotate photoconductor drum 42 in the direction of arrow 52.

In the shown example, the image-forming assembly for surface 46 of EP engine 12s is used to form layers 64s of the support material (referred to as support material 66s), where a supply of support material 66s may be retained by development station 58 (of EP engine 12s) along with carrier particles. Similarly, the image-forming assembly for surface 46 of EP engine 12p is used to form layers 64p of the part material (referred to as part material 66p), where a supply of part material 66p may be retained by development station 58 (of EP engine 12p) along with carrier particles.

Charge inducer 54 is configured to generate a uniform electrostatic charge on surface 46 as surface 46 rotates in the direction of arrow 52 past charge inducer 54. Suitable devices for charge inducer 54 include corotrons, scorotrons, charging rollers, and other electrostatic charging devices.

Imager 56 is a digitally-controlled, pixel-wise light exposure apparatus configured to selectively emit electromagnetic radiation toward the uniform electrostatic charge on surface 46 as surface 46 rotates in the direction of arrow 52 past imager 56. The selective exposure of the electromagnetic radiation to surface 46 corresponds to the associated bitslices received from controller assembly 38 over communication line 40a, and causes discrete pixel-wise locations of the electrostatic charge to be removed (i.e., discharged to ground), thereby forming latent image charge patterns on surface 46.

Suitable devices for imager 56 include scanning laser (e.g., gas or solid state lasers) light sources, light emitting diode (LED) array exposure devices, and other exposure device conventionally used in 2D electrophotography systems. In alternative embodiments, suitable devices for charge inducer 54 and imager 56 include ion-deposition systems configured to selectively directly deposit charged ions or electrons to surface 46 to form the latent image charge pattern. As such, as used herein, the term "electrophotography" includes ionography.

Each development station 58 is an electrostatic and magnetic development station or cartridge that retains the supply of part material 66p or support material 66s, preferably in powder form, along with carrier particles. Development stations 58 may function in a similar manner to single or dual component development systems and toner cartridges used in 2D electrophotography systems. For example, each development station 58 may include an enclosure for retaining the part material 66p or support material 66s and carrier particles. When agitated, the carrier particles generate triboelectric charges to attract the powders of the part material 66p or support material 66s, which charges the attracted powders to a desired sign and magnitude based on their Q/M ratios.

Each development station 58 may also include one or more devices for transferring the charged part material 66p or support material 66s to surface 46, such as conveyors, fur brushes, paddle wheels, rollers, and/or magnetic brushes. For instance, as surface 46 (containing the latent charged image) rotates from imager 56 to development station 58 in the direction of arrow 52, the charged part material 66p or support material 66s is attracted to the appropriately charged regions of the latent image on surface 46, utilizing either charged area development or discharged area development (depending on the electrophotography mode being utilized).

This creates successive layers 64p or 64s as photoconductor drum 12 continues to rotate in the direction of arrow 52, where the successive layers 64p or 64s correspond to the successive bitslices of the digital model of the 3D part or support structure. After being developed, the successive layers 64p or 64s are then rotated with surface 46 in the direction of arrow 52 to a transfer region in which layers 64p or 64s are successively transferred from photoconductor drum 42 to belt 22. While illustrated as a direct engagement between photoconductor drum 42 and belt 22, in some preferred embodiments, EP engines 12p and 12s may also include intermediary transfer drums and/or belts, as discussed further below in FIG. 3.

After a given layer 64p or 64s is transferred from photoconductor drum 42 to belt 22 (or an intermediary transfer drum or belt), drive motor 50 and shaft 48 continue to rotate photoconductor drum 42 in the direction of arrow 52 such that the region of surface 46 that previously held the layer 64p or 64s passes cleaning station 60. Cleaning station 60 is a station configured to remove any residual, non-transferred portions of part or support material 66p or 66s. Suitable devices for cleaning station 60 include blade cleaners, brush cleaners, electrostatic cleaners, vacuum-based cleaners, and combinations thereof.

After passing cleaning station 60, surface 46 continues to rotate in the direction of arrow 52 such that the cleaned regions of surface 46 pass discharge device 62 to remove any residual electrostatic charge on surface 46, prior to starting the next cycle. Suitable devices for discharge device 62 include optical systems, high-voltage alternating-current corotrons and/or scorotrons, one or more rotating dielectric rollers having conductive cores with applied high-voltage alternating-current, and combinations thereof.

Transfer belt 22 is a transfer medium for transferring the developed successive layers 64p and 64s from photoconductor drum 42 (or an intermediary transfer drum or belt) to layer transfusion assembly 20. Examples of suitable transfer belts for belt 22 include those disclosed in Comb et al., U.S. Publication Nos. 2013/0186549 and 2013/0186558. Belt 22 includes front surface 22a and rear surface 22b, where front surface 22a faces surfaces 46 of photoconductor drums 42 and rear surface 22b is in contact with biasing mechanisms 16 and 18.

Biasing mechanisms 16 and 18 are configured to induce electrical potentials through belt 22 to electrostatically attract layers 64p and 64s from EP engines 12p and 12s to belt 22. Because layers 64p and 64s are each only a single layer increment in thickness at this point in the process, electrostatic attraction is suitable for transferring layers 64p and 64s from EP engines 12p and 12s to belt 22.

Controller assembly 38 preferably rotates photoconductor drums 42 of EP engines 12p and 12s at the same rotational rates that are synchronized with the line speed of belt 22 and/or with any intermediary transfer drums or belts. This allows system 10 to develop and transfer layers 64p and 66s in coordination with each other from separate developer images. In particular, as shown, each part layer 64p may be transferred to belt 22 with proper registration with each support layer 64s to preferably produce a combined or composite part and support material layer 64.

This allows layers 64p and 64s to be transfused together, requiring the part and support materials to have thermal properties and melt rheologies that are similar or substantially the same. As can be appreciated, some layers transferred to layer transfusion assembly 20 may only include support material 66s or may only include part material 66p, depending on the particular bitslices that are transmitted to each of EP engines 12p and 12s.

In an alternative embodiment, part layers 64p and support layers 64s may optionally be developed and transferred along belt 22 separately, such as with alternating layers 64p and 64s. These successive, alternating layers 64p and 64s may then be transferred to layer transfusion assembly 20, where they may be transfused separately to print the 3D part and support structure.

Figure 3:
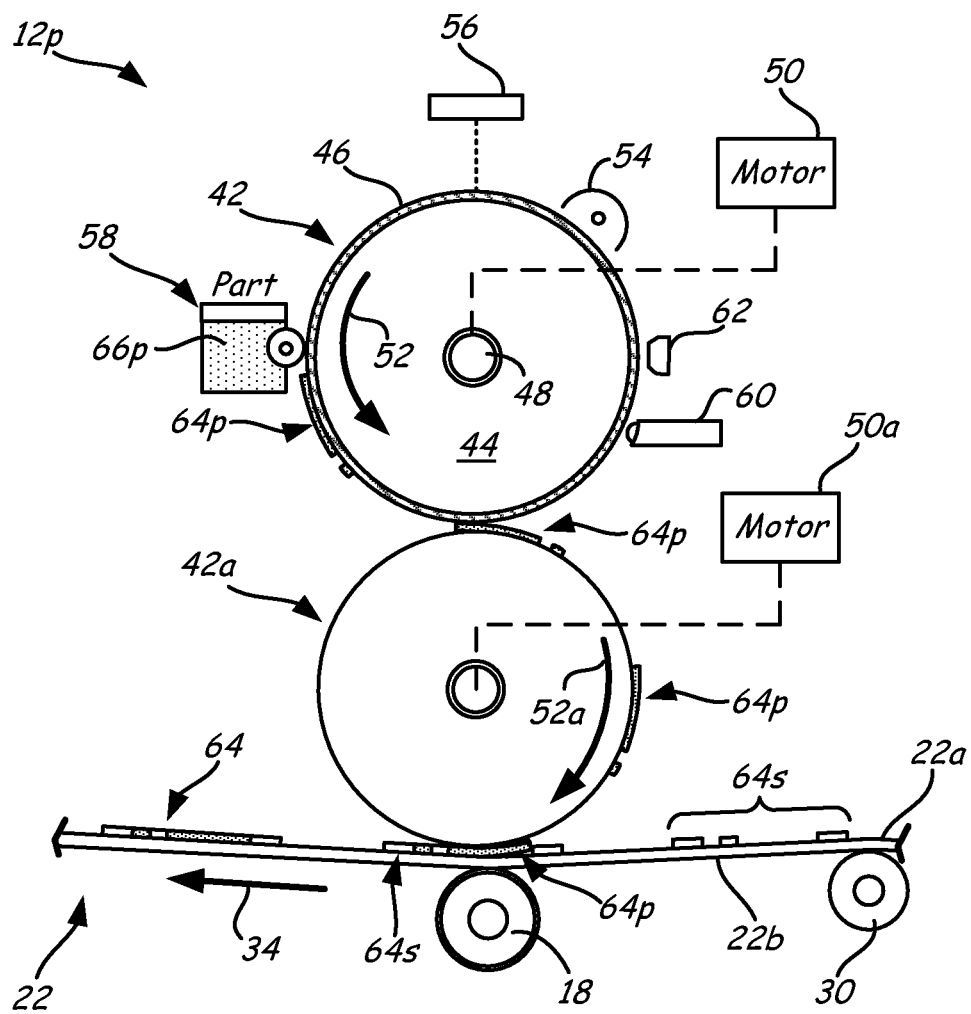
FIG. 3 is a schematic front view of an alternative electrophotography engine, which includes an intermediary drum or belt.

In some embodiments, one or both of EP engines 12p and 12s may also include one or more intermediary transfer drums and/or belts between photoconductor drum 42 and belt 22. For example, as shown in FIG. 3, EP engine 12p may also include intermediary drum 42a that rotates an opposing rotational direction from arrow 52, as illustrated by arrow 52a, under the rotational power of motor 50a. Intermediary drum 42a engages with photoconductor drum 42 to receive the developed layers 64p from photoconductor drum 42, and then carries the received developed layers 64p and transfers them to belt 22.

EP engine 12s may include the same arrangement of intermediary drum 42a for carrying the developed layers 64s from photoconductor drum 42 to belt 22. The use of such intermediary transfer drums or belts for EP engines 12p and 12s can be beneficial for thermally isolating photoconductor drum 42 from belt 22, if desired.

Figure 4:
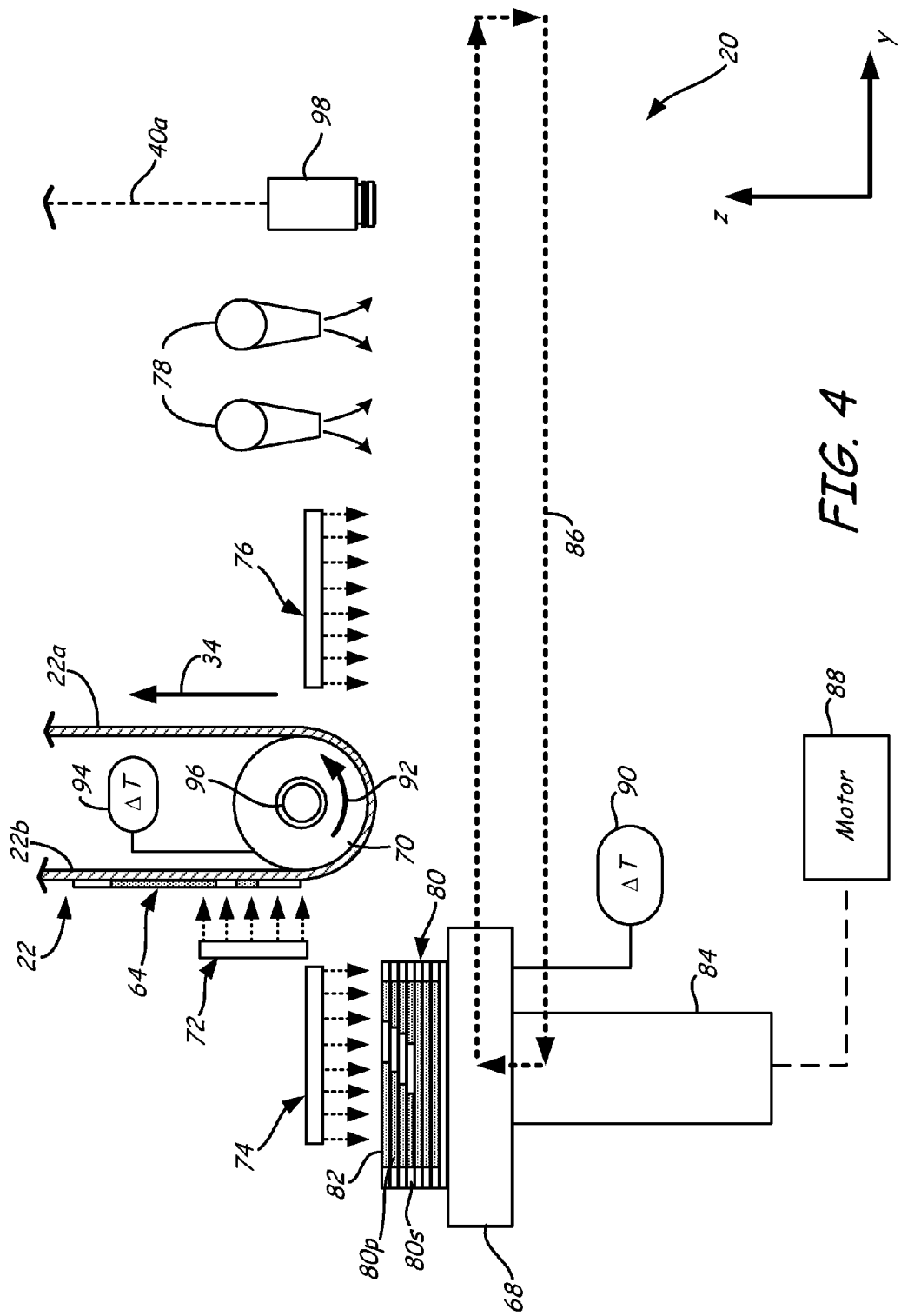
FIG. 4 is a schematic front view of a layer transfusion assembly of the system for performing layer transfusion steps with the developed layers, and for measuring layer heights with one or more sensors.

FIG. 4 illustrates an example embodiment for layer transfusion assembly 20. As shown, layer transfusion assembly 20 includes build platform 68, nip roller 70, heaters 72 and 74, post-fuse heater 76, and air jets 78 (or other cooling units). A suitable operation of layer transfusion assembly 20 is discussed in Comb et al., U.S. Publication Nos. 2013/0186549 and 2013/0186558.

Briefly, build platform 68 is a platform assembly or platen of system 10 that is configured to receive the heated combined layers 64 (or separate layers 64p and 64s) for printing a 3D part and support structure, referred to as 3D part 80p and support structure 80s, in a layer-by-layer manner. For ease of discussion, 3D part 80p and support structure 80s are herein referred to collectively as 3D part 80, which has an intermediate build surface 82 on which a subsequent layer 64 can be applied onto.

In some embodiments, build platform 68 may include removable film substrates (not shown) for receiving the printed layers 64, where the removable film substrates may be restrained against build platform using any suitable technique (e.g., vacuum drawing, removable adhesive, mechanical fastener, magnetic attraction, and the like). Build platform 68 is supported by gantry 84, which is a gantry mechanism configured to move build platform 68 along the z-axis and the y-axis, preferably to produce a reciprocating rectangular pattern, where the primary motion is back-and-forth along the y-axis (illustrated by broken lines 86).

While the reciprocating rectangular pattern is described as a rectangular pattern with sharp axial corners (defined by arrows 86), gantry 84 may move build platform 68 in a reciprocating rectangular pattern having rounded or oval-defining corners, so long as build platform 68 moves along the y-axis during the pressing steps. Gantry 84 may be operated by motor 88 based on commands from controller assembly 38, where motor 88 may be an electrical motor, a hydraulic system, a pneumatic system, or the like. In the shown embodiment, build platform 68 is heatable with heating element 90 (e.g., an electric heater), which is configured to heat and maintain build platform 68 at a desired elevated temperature.

Nip roller 70 is an example heatable element or heatable layer transfusion element, which is configured to rotate around a fixed axis with the movement of belt 22. In particular, nip roller 70 may roll against rear surface 22b in the direction of arrow 92 while belt 22 rotates in the direction of arrow 34. In the shown embodiment, nip roller 70 is heatable with heating element 94 (e.g., an electric heater). Heating element 94 is configured to heat and maintain nip roller 70 at a desired elevated temperature.

Heater 72 is one or more heating devices (e.g., an infrared heater and/or a heated air jet) configured to heat layers 64 to a desired elevated temperature prior to reaching nip roller 70. Each layer 64 desirably passes by (or through) heater 72 for a sufficient residence time to heat the layer 64 to the desired elevated temperature. Heater 74 is an optional heater that may function in the same manner as heater 72, and heats build surface 82 of 3D part 80 to a desired elevated temperature. Post-fuse heater 76 is located downstream from nip roller 70 and upstream from air jets 78, and is configured to heat the transfused layers to a desired elevated temperature in the post-fuse or heat-setting step.

The desired elevated temperatures mentioned above may be independently selected and preset temperatures for transfusing the layers 64p and the support layers 64s together to the build surface 82 of 3D part 80 as combined or composite layers 64. Examples of suitable desired elevated temperatures for each step in layer transfusion assembly 20 include those discussed in Comb et al., U.S. Publication Nos. 2013/0186549 and 2013/0186558.

During the printing operation, belt 22 carries a layer 64 past heater 72, which may heat the layer 64 and the associated region of belt 22 to the desired elevated temperature. Correspondingly, gantry 84 may optionally move build platform 68 (with 3D part 80) along the y-axis below, along, or through heater 74.

The continued rotation of belt 22 and the movement of build platform 68 align the heated layer 64 with the heated build surface 82 of 3D part 80, preferably with proper overlay in the x-y plane. Gantry 84 may continue to move build platform 68 along the y-axis, at a rate that is synchronized with the rotational rate of belt 22 in the direction of arrow 34 (i.e., the same directions and speed). This causes rear surface 22b of belt 22 to rotate around nip roller 70 to nip belt 22 and the heated layer 64 against the build surface 82 of 3D part 80. This presses the heated layer 64 between the heated build surface 82 of 3D part 80 at the location of nip roller 70, which at least partially transfuses heated layer 64 to the build surface 82 of 3D part 80.

As the transfused layer 64 passes the nip of nip roller 70, belt 22 wraps around nip roller 70 to separate and disengage from build platform 68. This assists in releasing the transfused layer 64 from belt 22, allowing the transfused layer 64 to remain adhered to 3D part 80. After release, gantry 84 continues to move build platform 68 along the y-axis to post-fuse heater 76.

At post-fuse heater 76, the top-most layers of 3D part 80 (including the transfused layer 64) may then be heated in a post-fuse or heat-setting step. This preferably melts the part and support materials of the transfused layer 64 to a highly fusible state such that polymer molecules of the transfused layer 64 quickly inter-diffuse to achieve a high level of interfacial entanglement with 3D part 80.

Additionally, as gantry 84 continues to move build platform 68 along the y-axis past post-fuse heater 76 to air jets 78, air jets 78 blow cooling air towards the top layers of 3D part 80. This actively cools the transfused layer 64 down to the average part temperature, thereby preferably keeping 3D part 80 at the average part temperature as also discussed in Comb et al., U.S. Publication Nos. 2013/0186549 and 2013/0186558.

Gantry 84 may then actuate build platform 68 downward, and move build platform 68 back along the y-axis to a starting position along the y-axis, following the reciprocating rectangular pattern 86. Build platform 68 desirably reaches the starting position for proper registration with the next layer 64. In some embodiments, gantry 84 may also actuate build platform 68 and 3D part 80 upward for proper overlay with the next layer 64. The same process may then be repeated for each remaining layer 64 of 3D part 80.

As can be seen from the above description of system 10, layers 64 are subjected to numerous processing conditions that can affect the dimensional accuracies of the resulting 3D part 80. For instance, at EP engine(s) 12*p* and 12*s*, the thicknesses of layers 64*p* and 64*s* can fluctuate in response to variations in the Q/M ratios and M/A values. In the electrophotographic process, the part and support materials are preferably charged triboelectrically through the mechanism of frictional contact charging with carrier particles at EP engine(s) 12*p* and 12*s*. This charging of the part or support material may be referred to by its Q/M ratio, which may be a positive or negative charge and has a desired magnitude.

The Q/M ratio is inversely proportional to the powder density of the part or support material, which can be referred to by its M/A value. For a given applied development field, as the value of Q/M ratio of the part or support material is increased from a given value, the M/A value of the part or support material decreases, and vice versa. Thus, the powder density for each developed layer 64*p* and 64*s* is a function of the Q/M ratio of the part or support material. If the Q/M ratio varies over the cross-section of a given layer 64*p* or 64*s*, the powder density of the layer 64*p* or 64*s* will also vary. Variations in the powder density correspondingly vary the thicknesses of the layers 64*p* and 64*s*, which, when transfused to the previously-printed layers 64 of the 3D part or support structure, can result in z-height variations.

Additionally, other potential issues can also occur during the printing operation, such as edge lifting of the printed layers (e.g., upon separation from belt 22 at layer transfusion assembly 20), interference by the interfaces of the part and support materials, part accumulation rate errors, thermal effects at layer transfusion assembly 20, potential warping and curling issues, and the like. These types of accuracy errors can accumulate over the successively printed layers 64, thereby potentially propagating z-height errors over time.

As such, system 10 also includes one or more sensors configured to measure z-heights of the printed 3D part 80 in real time while the layers 64 are printed. In the shown example, system 10 may include a pair of strain gauges 96 on the opposing ends of nip roller 70, and/or one or more imaging sensors 98 downstream from air jets 78 (or at any other suitable location along the movement path of build platform 68).

In embodiments incorporating strain gauges 96, strain gauges 96 may measure the nip force between the heated layer 64 and the heated build surface 82 of 3D part 80 at the location of nip roller 70. Strain gauges 96 may also transmit signals relating to the measured nip forces to controller assembly 38 over communication line 40*a*. Controller assembly 38 may then calculate an average nip force from the sum of the measured signals (minus the tare of each strain gauges 96).

Since the size of the printed 3D part 80 along the lateral x-axis (perpendicular to the process direction along the y-axis) is substantially known, controller assembly 38 can then calculate the nip length. Furthermore, since the spring constant of nip roller 70 is known, the average nip pressure can be interpreted as the average z-height of the printed 3D part 80 at a location point of each strain gauge 96 in the y-axis process direction. The difference between the two signals of strain gauges 96 can similarly be related to a linear change in z-height along the lateral x-axis, thereby providing the z-height measurements.

In more preferred embodiments, system 10 includes one or more imaging sensors 98. While strain gauges 96 provide a lower-cost solution to measuring z-heights, imaging sensor 98 can achieve substantially greater z-height measurement resolutions. As such, in embodiments in which system 10 includes the one or more imaging sensors 98, strain gauges 96 may be optionally omitted.

Figure 5A:
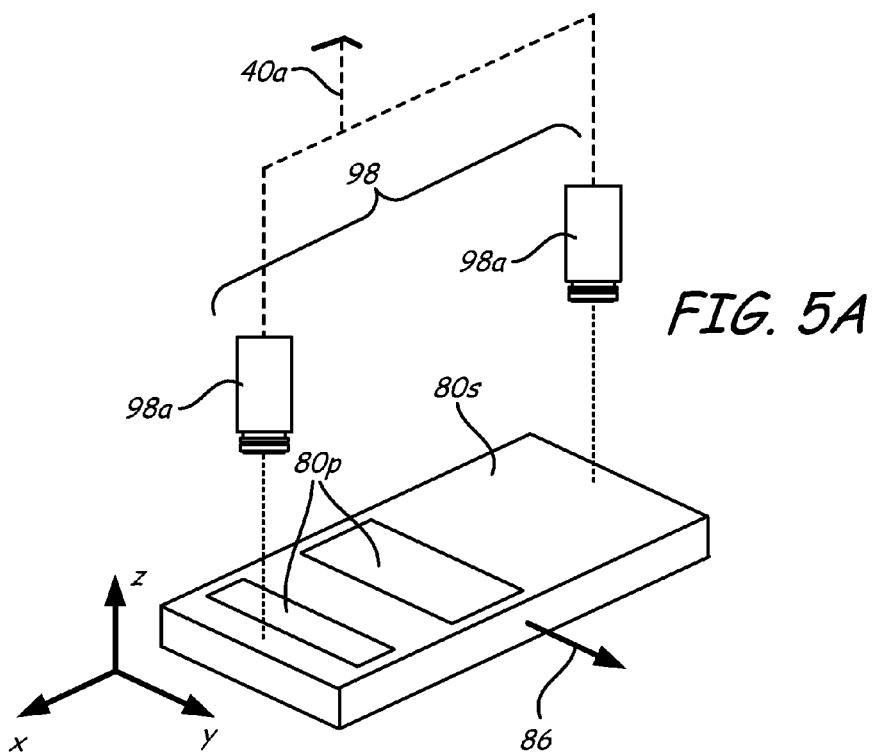
FIG. 5A is a perspective view of a pair of point z-height detectors for measuring layer heights.

In one embodiment, as shown in FIG. 5A, imaging sensor 98 may include one or more point z-height detectors 98*a* (e.g., laser measurement detectors), which are directed at constant x-positions in the x-y build plane. The z-heights for the x-positions may then be measured as the printed 3D part 80 traverse along the y-axis process direction using light section triangulation.

Figure 5B:
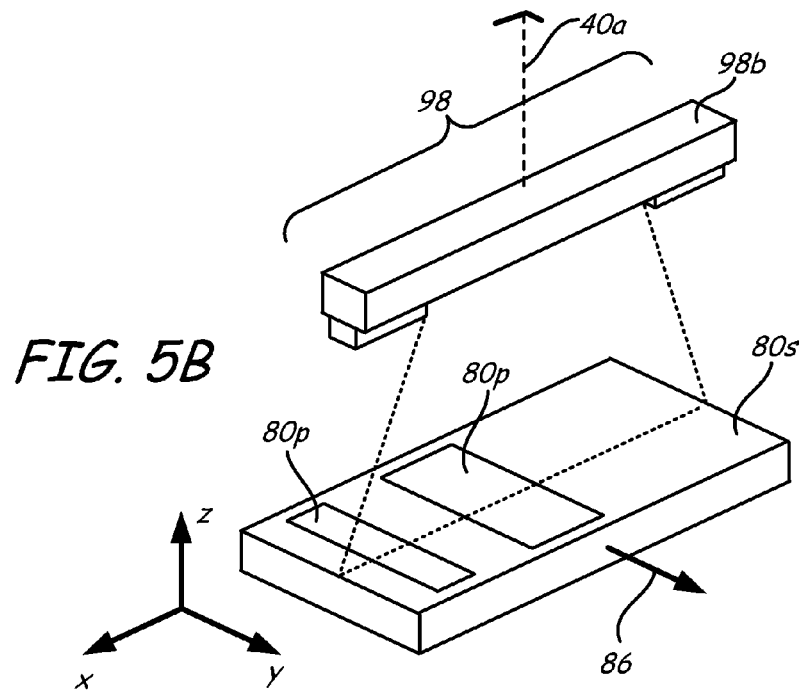
FIG. 5B is a perspective view of a line scanner for measuring layer heights.

More preferably, as shown in FIG. 5B, imaging sensor 98 includes a line scanner 98*b* (or multiple line scanners 98*b*) oriented along the lateral x-axis. The z-heights for the entire lateral x-axis line may then be measured as the printed 3D part 80 traverse along the y-axis process direction. This generates z-height measurements for the entire printed 3D part 80 in the x-y build plane with high pixel resolutions.

The actual build surface 82 of 3D part 80 being printed has a single valued z-height that can be expressed in polynomials in the y-axis process direction and x-axis lateral direction by Equation 1:

$$Z_p(n, x, y) = \left\{\sum_{i=0}^{\infty} a_i x^i\right\}\left\{\sum_{j=0}^{\infty} b_j y^j\right\} \quad \text{(Equation 1)}$$

Based on this polynomial expression, z-height sensors such as strain gauges 96 may achieve resolutions that inform the polynomial expansions of $a_0$, $a_1$, $b_0$, $b_1$, and potentially $b_2$. In comparison, the point z-height detectors 98*a* shown in FIG. 5A are capable of informing the polynomial expansions $a_0$, $a_1$, $b_0$, $b_1$, $b_2$, $b_3$, $b_4$, and potentially $b_5$, thereby providing significantly higher resolutions than those achievable with strain gauges 96. Moreover, the line scanner 98*b* shown in FIG. 5B is capable of informing the first 20-40 terms in each polynomial expansion, thereby providing very high resolutions.

Due to these high resolutions, line scanner 98*b* preferably has sufficient bandwidth to scan the printed layers 64 with sufficient x-y spatial resolution while system 10 operates at a desired printing speed in the y-axis process direction, such as from about 2 inches/second to about 8 inches/second (or faster). For example, a line scanner 98*b* configured to scan a volume with an x-y spatial resolution of 600 dots-per-inch (dpi) and a printing speed of 8 inches/second corresponds to a bandwidth of about 23 megapixels/second. This corresponds to about 46 megabytes for a grayscale application with two bits/pixel, and substantially greater bandwidth requirements when color differentiation is desired (e.g., multiple colored part materials), which may have 8-24 (or more) bits/pixel.

Figure 6:
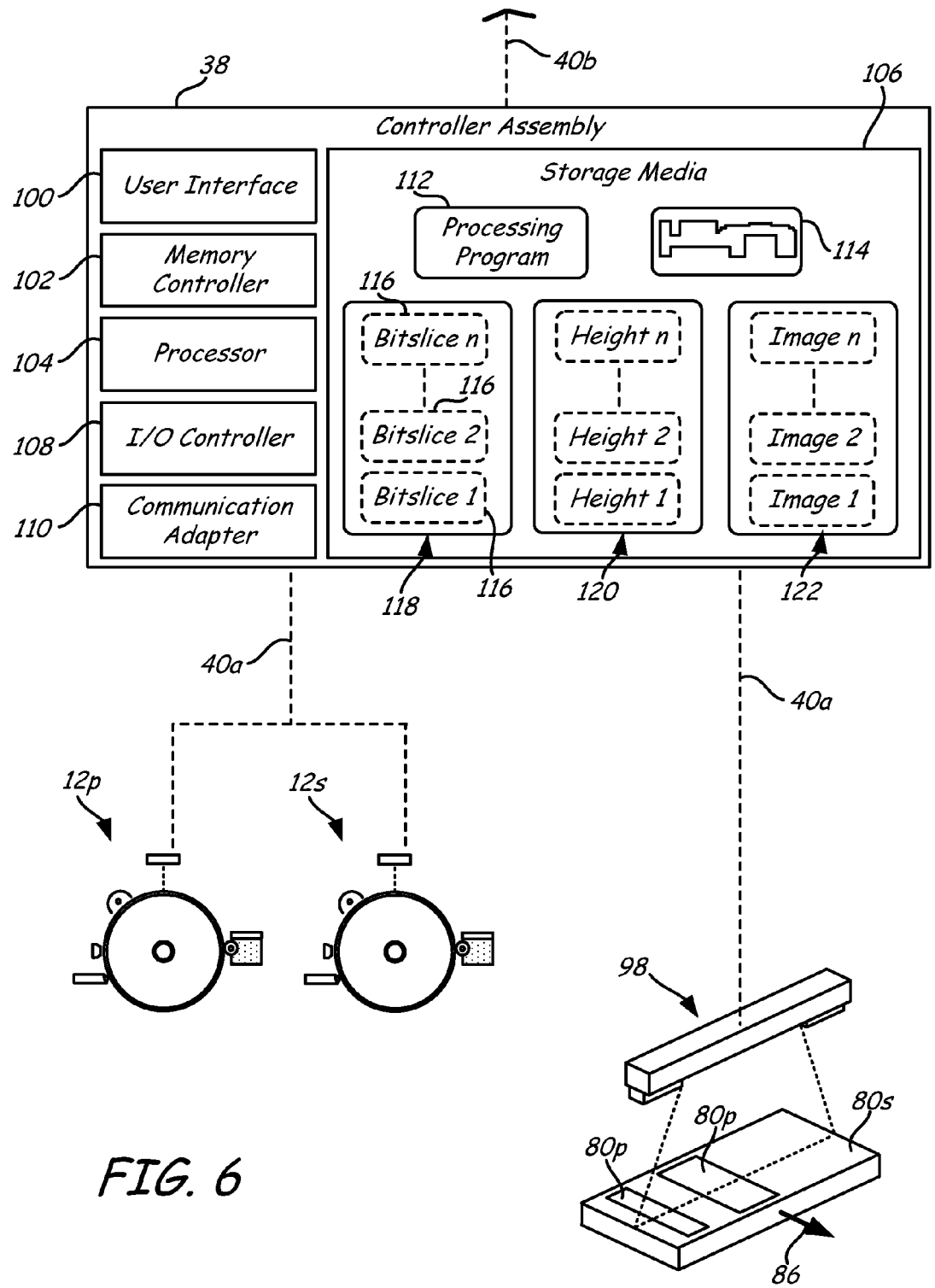
FIG. 6 is a schematic illustration of a controller assembly of the system, illustrating the virtual planarization control.

The z-heights measured for each layer 64 are preferably transmitted to computer controller assembly 38 over communication line 40*a* in real time with the printing of the layers 64. As shown in FIG. 6, controller assembly 38 may include any suitable computer-based hardware, such as user interface 100, memory controller 102, processor 104, storage media 106, input/output (I/O) controller 108, and communication adapter 110. Controller assembly 38 may also include a variety of additional components that are contained in conventional computers, servers, media devices, and/or printer controllers.

User interface 100 is a user-operated interface (e.g., keyboards, touch pads, touch-screen displays, display monitors, and other eye, voice, movement, or hand-operated controls) configured to operate controller assembly 38. Memory controller 102 is a circuit assembly that interfaces the components of controller assembly 38 with one or more volatile random access memory (RAM) modules of storage media 106. Processor 104 is one or more computer-processing units configured to operate controller assembly 38, optionally with memory controller 102. For instance, processor 104 may include one or more microprocessor-based engine control systems and/or digitally-controlled raster imaging processor systems.

Storage media 106 is one or more internal and/or external data storage devices or computer storage media for controller assembly 38, such as volatile RAM modules, read-only memory modules, optical media, magnetic media (e.g., hard disc drives), solid-state media (e.g., FLASH memory and solid-state drives), analog media, and the like. Storage media 106 may retain an executable copy of processing program 112, and may retain one or more digital models to be printed with system 10, such as digital model 114. Controller assembly 38 may receive digital model 114 over communication line 40b, where digital model 114 may have any suitable file format, such as an STL file format, an AMF file format, and the like.

Processing program 112 is one or more pre-processing and/or post-processing programs for optionally orienting digital model 114, slicing the oriented digital model 114 into layers, generating support structures, generating bitslices 116 for each layer, generating a bitslice stack 118 from the bitslices 116 and associated frame sequences, and the like. As discussed below, processing program 112 may also perform post-processing functions to modify bitslice stack 118 based on feedback controls from strain gauges 96 and/or imaging sensors 98.

Each bitslice 116 in bitslice stack 118 preferably has a raster graphics file format corresponding to a sliced layer of digital model 114 (and the corresponding support structure), where each bitslice 116 has a bitslice increment or thickness along the z-axis and multiple pixels in the x-y plane. Accordingly, the area of a pixel in the x-y plane and the bitslice thickness along the z-axis corresponds to a voxel of the printed 3D part 80p or support structure 80s.

Suitable image file formats for bitslices 116 include bitmaps, as well as Joint Photographic Experts Group (JPEG), Tagged Image File Format (TIFF), Portable Network Graphics (PNG), and Graphics Interchange Format (GIF). As used herein, the term "bitmap" refers to a file format having one or more bits/pixel (i.e., a pixelmap). Each bitslice 116 is also preferably compressed to a standard compression format to reduce bandwidth demands. Furthermore, each bitslice 116 also preferably includes header information, such as frame sequence data, alignment offsets, best fit coefficients to the surface quadratic in the x-y build plane, and the like.

I/O controller 108 is a circuit assembly that interfaces memory controller 102, processor 104, and storage media 106 with various input and output components of controller assembly 38, including communication adapter 110. Communication adapter 110 is one or more wired or wireless transmitter/receiver adapters configured to communicate over communication lines 40a and 40b.

During a printing operation, controller assembly 38 executes processing program 112 to generate bitslices 116 and bitslice stack 118 from digital model 114, where bitslice stack 118 is stored on storage media 106. When ready, controller assembly 38 transmits successively bitslices 116 to EP engines 12p and 12s to respectively develop a part layer 64p and/or a support layer 64s based on each successive bitslice 116. Each developed layer 64 is accordingly carried by belt 22 to layer transfusion assembly 20. As discussed above, layer transfusion assembly 20 transfers and bonds each layer 64 onto build platform 68, or onto the previously-transfused layer 64 to print 3D part 80p and support structure 80s.

Upon being printed, gantry 84 moves build platform 68 and each printed layer 64 past imaging sensor 98 in the process direction (of arrow 86), and imaging sensor 98 measures the z-heights of the top surface. These z-height measurements are transmitted from imaging sensor 98 to controller assembly 38 in real time via communication line 40a, and may be stored as z-height data 120 for each printed layer 64 on storage media 106. This z-height data 120 may also include related data, such as timing signals for the start-of-frame, and the like for each printed layer 64.

Upon receipt of z-height data 120 for a given printed layer 64, computer 38 may use processing program 112 to generate a composite image 122 for the printed layer 64, which may be calibrated and corrected for dimensional accuracies, and may be compressed to the standard compression format with a file header.

Controller assembly 38 then compares the composite image 122 to the bitslice 116 for the same printed layer 64. Based on this comparison, controller assembly 38 may then modify bitslice stack 118 based on the comparison to compensate for topographical error regions (i.e., underfilled and/or overfilled regions).

In one embodiment, this compensation is performed by utilizing the size of the $a_0$, $b_0$, term from Equation 1, which gives the average planar climb error (assuming all higher order terms are zero or unknown). In this situation, if the term $a_0$, $b_0$, is greater than the bitslice thickness for bitslice 116, controller assembly 38 may omit the next pending bitslice 116 in bitslice stack 118 (i.e., skip printing the next layer).

Alternatively if the term $a_0$, $b_0$, is less than the bitslice thickness for bitslice 116, controller assembly 38 may print the most previously-transmitted bitslice 116 again (i.e., print the same layer twice). In either situation, controller assembly 38 may modify the timing sequence of bitslice stack 118 to omit or repeat the bitslices 116. This embodiment accordingly compensates for topographical error regions on a bitslice-by-bitslice basis.

Another preferred embodiment involves compensating on a voxel-by-voxel basis, rather than on a bitslice-by-bitslice basis. In this voxel-by-voxel embodiment, if one or more underfilled regions are identified, controller assembly 38 may introduce one or more additional bitslices 116 into bitslice stack 118 to compensate for these underfilled region(s). Additionally, if one or more overfilled regions are identified, controller assembly 38 may modify one or more of the pending bitslices 116 in bitslice stack 118 to compensate for these overfilled region(s). These modifications to bitslice stack 118 effectively planarize 3D part 80p and support structure 80s during the subsequent printing steps.

FIGS. 7A-18 illustrate a process for comparing the z-height composite image 122 for a given printed layer 64 to the predicted bitslice height for the same printed layer 64, and for modifying bitslice stack 118 based on this comparison to compensate for identified topographical error regions (i.e., underfilled and/or overfilled regions) on a voxel-by-voxel basis. As shown in FIG. 7A, bitslice stack 118 includes the successive bitslices 116 that are stacked based on the frame sequence for printing the associated layers 64. As further shown, bitslices 116 are separated into part material portions 116p (for printing 3D part 80p) and support material portions 116s (for printing support structure 80s).

The following example is described based on a two-dimensional portion of bitslice stack 118 taken in the x-z plane, as shown in FIG. 7B. This is for ease of discussion, and it is understood that controller assembly 38 may actually perform the comparison and modification in three-dimensions.

During the printing operation, controller assembly 38 transmits each successive bitslice 116 to EP engines 12p and 12s, where the part material portions 116p of each bitslice 116 are transmitted to EP engine 12p, and the support material portions 116s of each bitslice 116 are transmitted to EP engine 12s. EP engines 12p and 12s then develop layers 64 for each bitslice 116, and the successive layers 64 are transfused together at layer transfusion assembly 20 to print 3D part 80p and support structure 80s. Imaging sensor 98 accordingly measures the z-heights for each printed layer 64 in real time, and transmits the z-height data 120 to controller assembly 38 over communication line 40a.

As shown in FIG. 8, in the current example, when a given bitslice 116, is printed, imaging sensor 98 measures the z-heights for this printed layer $64_i$, and transmits the z-height data $120_i$ to controller assembly 38. The subscripts "i", "i+1", "i+2", and the like are used herein to associate the related printed layers 64, bitslices 116, z-height data 120, and z-height composite images 122.

As shown in FIG. 9, upon receipt of z-height data $120_i$, controller assembly 38 generates a composite image $122_i$ for the printed layer $64_i$ from the received z-height data $120_i$, where the illustrated hills and valleys of composite image $122_i$ are highly exaggerated for ease of viewing. Controller assembly 38 may then compare the z-height of each pixel in composite image $122_i$ to the predicted bitslice height of bitslice $116_i$ (referred to as predicted bitslice height $124_i$) to determine the difference between these z-heights.

For each pixel in composite image $122_i$, controller assembly 38 then compares this determined z-height difference to a threshold value, such as the bitslice thickness for bitslices 116 (referred to as bitslice thickness 126). In other words, controller assembly 38 determines whether a given pixel in composite image $122_i$ has a z-height that is above or below the predicted bitslice height $124_i$ by one bitslice thicknesses 126 or more.

If the pixel of composite image $122_i$ has a z-height that is below the predicted bitslice height $124_i$ by one bitslice thicknesses 126 or more, then controller assembly 38 identifies that this voxel in the printed layer $64_i$, is underfilled. This is illustrated in FIG. 9 at underfilled regions 128, each of which contains voxels that are underfilled by more than one bitslice thickness 126 below the predicted bitslice height $124_i$.

Alternatively, if the pixel of composite image $122_i$ has a z-height that is above the predicted bitslice height $124_i$ by one bitslice thicknesses 126 or more, then controller assembly 38 identifies that this voxel in the printed layer $64_i$ is overfilled. This is illustrated in FIG. 9 at overfilled regions 130, each of which contains voxels that are overfilled by more than one bitslice thickness 126 above the predicted bitslice height $124_i$.

Underfilled regions 128 and overfilled regions 130 may be collectively referred to as "topographical error regions", which are regions having pixels with z-heights that are below or above the predicted bitslice height $124_i$ by one bitslice thickness 126 or more. Controller assembly 38 preferably compensates for underfilled regions 128 and overfilled regions 130 in different manners. For underfilled regions 128, controller assembly 38 generates one or more additional bitslices 116, and introduces them into bitslice stack 118 prior to the next-pending bitslice 116 in the frame sequence of bitslice stack 118. In comparison, for overfilled regions 130, controller assembly 38 modifies one or more pending bitslices 116 in bitslice stack 118 prior to their transmissions to EP engines 12p and 12s.

The above-discussed modifications to bitslices stack 118, however, are dependent on which bitslice 116 was most recently transmitted to EP engines 12p and 12s, and which bitslices 116 are still "pending". As used herein, a "pending bitslice" is a bitslice that has not yet been transmitted to EP engines 12p and 12s (or other printing device(s)). Clearly, there is little benefit to having controller assembly 38 modify a bitslice 116 after it has already been transmitted to EP engines 12p and 12s for developing layers 64p and 64s.

Figure 10:
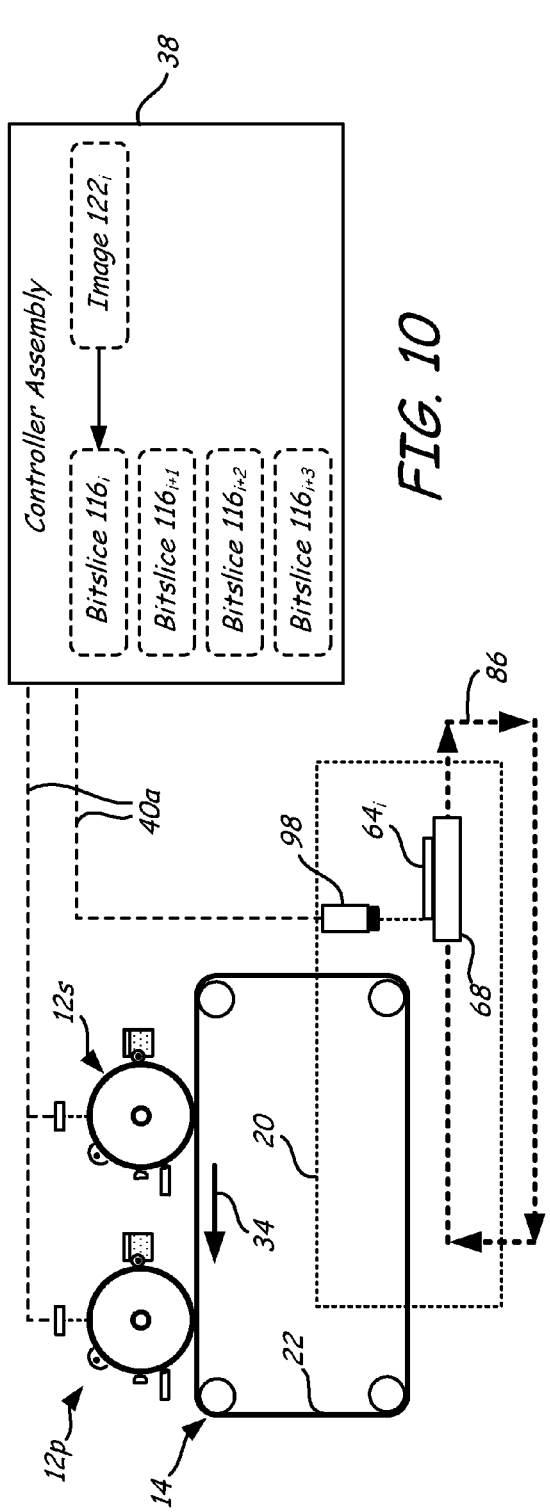
FIG. 10 is a schematic illustration of the controller assembly of and the system, illustrating a comparison step at a slower printing rate.
Figure 11:
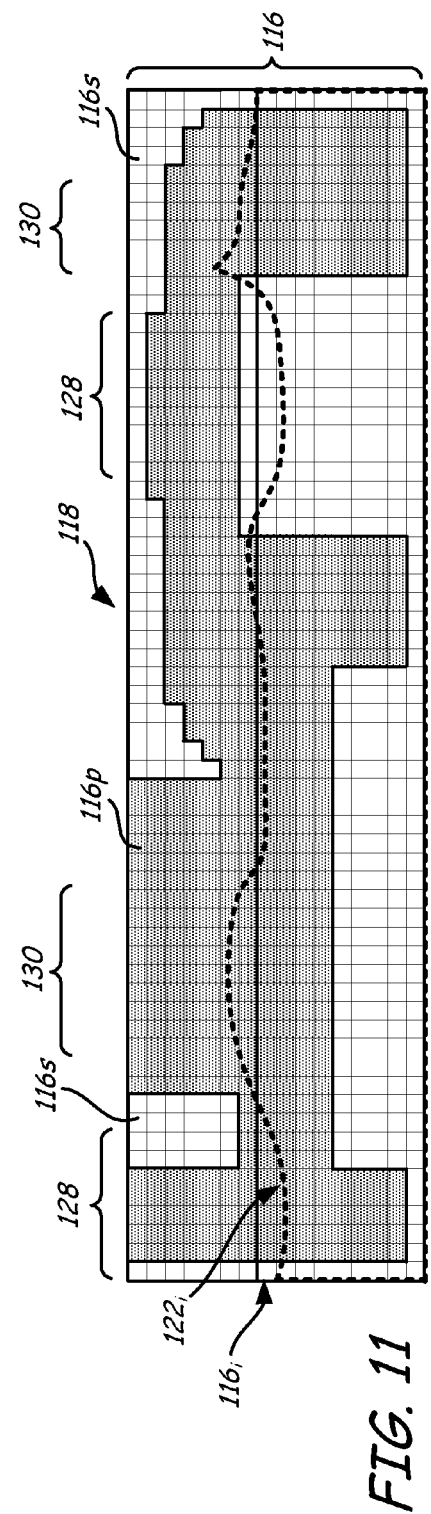
FIG. 11 is an illustration of the composite z-height image being compared to the bitslice stack for the slower printing rate example shown in FIG. 10, for compensating for underfilled and overfilled regions.

As shown in FIG. 10, if system 10 prints at a slow enough rate, layer $64_i$ is scanned at imaging sensor 98 (or strain gauges 96) prior to the next pending bitslice $116_{i+1}$ being sent to EP engines 12p and 12s to develop the subsequent layer $64_{i+1}$. In this case, controller assembly 38 may compensate for underfilled regions 128 and overfilled regions 130 relative to the most recently-transmitted bitslice 116 (i.e., bitslice $116_i$), as shown in FIG. 11. This is allowable because the next bitslice 116 in the frame sequence of bitslice stack 118 (i.e., bitslice $116_{i+1}$) is still pending (i.e., not yet transmitted to EP engines 12p and 12s).

Figure 12:
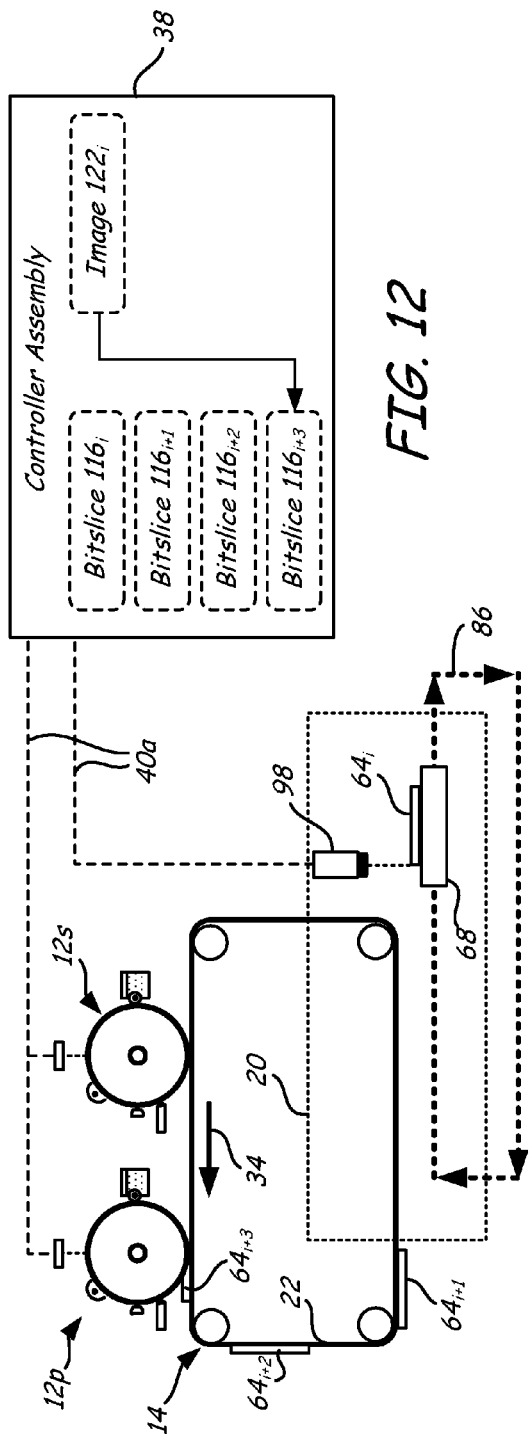
FIG. 12 is a schematic illustration of the controller assembly of and the system, illustrating a comparison step at a faster printing rate, which introduces feedback delays.

However, system 10 is capable of printing at high speeds, where multiple layers 64 are successively developed and transferred along belt 22 to layer transfusion assembly 20 prior to the first of these layers 64 reaching imaging sensor 98 (and/or strain gauges 96). This is illustrated in FIG. 12 by developed layers $64_i$, $64_{i+1}$, $64_{i+2}$, and $64_{i+3}$, and creates a multiple-layer feedback delay between the z-height signals transmitted from imaging sensor 98 and when the next layer 64 is developed by EP engines 12p and 12s.

This multiple-layer feedback delay is dependent on several factors, such as the printing speed of system 10, the gap distance between each layer 64 on belt 22, the transit distance along belt 22 between EP engines 12p/12s and layer transfusion assembly 20, the locations of strain gauges 96/imaging sensor 98, and any computational time requirements by controller assembly 38.

The complexity of this feedback delay is further complicated when multiple EP engines, such as EP engines 12p and 12s, are used because the individual EP engines develop their layers at different timing sequences. For example, in the shown embodiment, EP engine 12s develops support layer 64s prior to EP engine 12p developing the matching part layer 64p. This allows the developed layer 64s to travel downstream on belt 22 to EP engine 12p to receive the part layer 64p with proper registration (to produce the composite layer 64).

Figure 13:
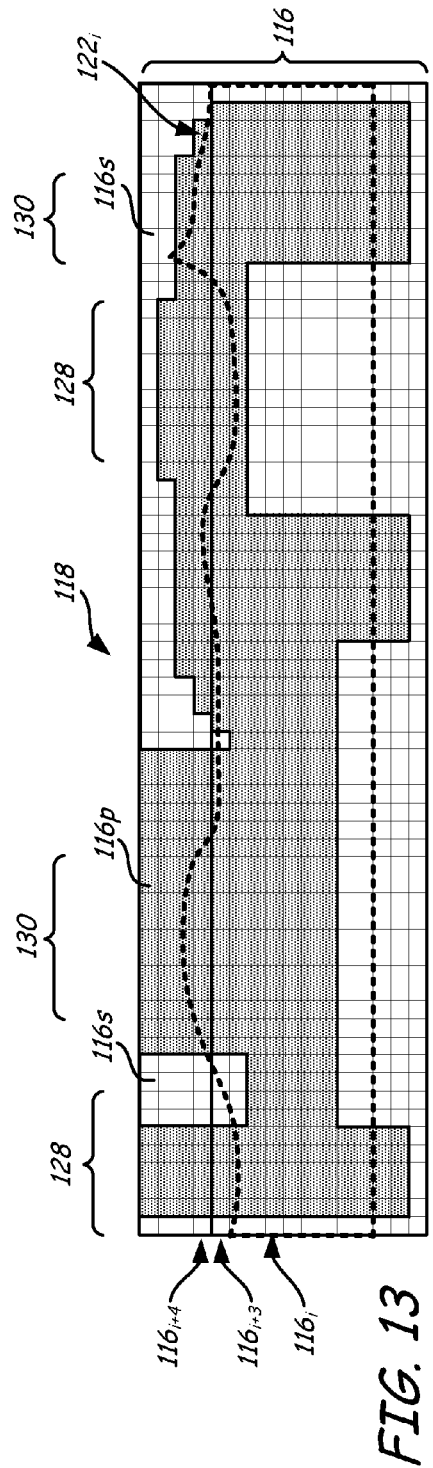
FIG. 13 is an illustration of the composite z-height image being compared to the bitslice stack for the faster printing rate example shown in FIG. 12 to compensate for underfilled and overfilled regions with the feedback delays.

Accordingly, because of this feedback delay, the most recently-transmitted bitslice 116 is no longer bitslice $116_i$. Instead, in the current example, a feedback delay corresponding to three layers $64_{i+1}$, $64_{i+2}$, and $64_{i+3}$ exists. As such, the most recently-transmitted bitslice 116 in this case is bitslice $116_{i+3}$. Accordingly, controller assembly 38 may compensate for underfilled regions 128 and overfilled regions 130 relative to bitslice $116_{i+3}$, as shown in FIG. 13. It is understood that the same analysis may be used for any suitable number of layers for the multiple-layer feedback delay, such as from 5 to 20 layers, and any integer value therebetween (e.g., 8 layers, 10 layers, etc. . . . ).

FIG. 14 illustrates an example technique for compensating for underfilled regions 128. As shown, controller assembly 38 generates an additional bitslice $116_{i+3a}$ having part material portions $122p$ and support material portions $122s$ at underfilled regions 128, based on the voxel arrangement of bitslice $116_{i+3}$. The resulting bitslice $116_{i+3a}$ may be then compressed to the standard compression format with a file header, as discussed above for bitslices 116, and introduced into the frame sequence of bitslice stack 118 between bitslice $116_{i+3}$ and bitslice $116_{i+4}$, where bitslice $116_{i+4}$ is the next pending bitslice 116 in the frame sequence of bitslice stack 118. This effectively allows bitslice $116_{i+3a}$ to jump into the frame sequence to print a layer $64_{i+3a}$ based on bitslice $116_{i+3a}$ to fill in the underfilled regions 128 prior to printing the next layer $64_{i+4}$. Furthermore, because bitslice $116_{i+3a}$ is added to fill in the underfilled regions 128, controller assembly 38 preferably does not modify the predicted stack heights 124 or the pending bitslices 116 (i.e., each subsequent bitslice 116 preferably remains at the same z-height).

In the current example, the underfilled regions 128 do not extend two or more bitslice thicknesses 126 below predicted stack height $124_i$ (shown above in FIG. 9). As such, only a single bitslice $116_{i+3a}$ is generated and introduced into the frame sequence of bitslice stack 118. However, in the event that a given voxel is underfilled by two or more bitslice thicknesses 126, controller assembly 38 may generate multiple successive bitslices $116_{i+3a}$, and introduce them into the frame sequence of bitslice stack 118 in the same manner.

FIGS. 15 and 16 illustrate an example technique for compensating for overfilled regions 130. As shown, in this compensation technique, controller assembly 38 modifies the one or more pending bitslices 116, such as bitslice $116_{i+4}$ (shown in FIG. 15) and bitslice $116_{i+5}$ (shown in FIG. 16) to remove the voxels located within overfilled regions 130. As shown in FIG. 16, the single voxel is removed from overfilled region 130 in bitslice $116_{i+5}$ because the z-height for the corresponding pixel in composite image $122i$ was greater than two bitslice thicknesses 126 above predicted stack height $124i$ (shown above in FIG. 9).

In comparison, as shown in FIG. 17, controller assembly 38 does not modify the existing bitslice $116_{i+6}$ because overfilled regions 130 (based on composite image $122_i$) did not extend into bitslice $116_{i+6}$. FIG. 18 accordingly illustrates the modified bitslice stack 118 above composite image $122_i$ where the accumulated z-height errors defined by composite image $122i$ are virtually planarized by the addition of bitslice $116_{i+3a}$, and by the modifications of the pending bitslices $116_{i+4}$ and $116_{i+5}$. This can increase printing accuracies for 3D part $80p$ and support structure $80s$, particularly while printing at fast speeds, while also reducing or precluding the need for a physical planarizing device.

The above discussion in FIGS. 9-18 are based on a feedback control of a single composite image $122_i$. However, controller assembly 38 preferably compensates for any identified topographical error regions based on multiple images 122 as the successive printed layers 64 are scanned by imaging sensor 98 (or strain gauges 96). As such, controller assembly 38 may continue to add and modify pending bitslices 116 in an iterative manner to continue to virtually planarize the printed layers 64 throughout the printing operation.

In some embodiments, controller assembly 38 may compare images 122 to bitslices 116 and compensate for any topographical error regions after preset intervals layers 64 are printed and scanned. For instance, controller assembly 38 may perform the comparison and compensation steps after intervals corresponding to the multiple-layer feedback delays. This can reduce the computational and bandwidth demands on controller assembly 38, while still effectively planarizing the printed layers 64. Additionally, while the above discussion describes the comparison and modification steps to be performed on each pixel or voxel, in alternative embodiments, portions of the pixels or voxels may be omitted from these comparison and modification steps to also reduce the computational and bandwidth demands on controller assembly 38, if desired.

Moreover, controller assembly 38 may also utilize the comparison and compensation steps for other purposes. For instance, if one or more pixels in an overfilled region has a z-height that is greater than a second threshold value above the predicted bitslice height 124, controller assembly 38 may display a visible and/or audible collision warning (e.g., via user interface 100), and optionally may disable operation of system 10, to protect layer transfusion assembly 20 from being subjected to excessive nip pressures (e.g., for belt 22 at nip roller 70), or from colliding with 3D part $80p$ and support structure $80s$.

After the printing operation is completed, the resulting 3D part $80p$ and support structure $80s$ may be removed from system 10 and undergo one or more post-printing operations, such as a support removal step. Furthermore, controller assembly 38 may generate reports for the printed 3D part $80p$, such as processing parameters and the like. More interestingly, controller assembly 38 may also generate a slideshow or video of the collection of composite images 122. This can assist with any potential processing and maintenance issues with system 10, and may also be enjoyable for a customer to view.

As mentioned above, the virtual planarizing discussed herein is particularly suitable for use with electrophotography-based additive manufacturing systems, but may also be used with any suitable image-based additive manufacturing system, such as a jetting-based additive manufacturing system. Examples of suitable jetting-based additive manufacturing systems include those discussed in Kritchman et al., U.S. Pat. No. 8,323,017. However, the virtual planarizing is particularly conducive for use with electrophotography-based additive manufacturing systems due to their the high printing speeds, which can be potentially slowed down with the use of physical planarizers, and which are subject to the multiple-layer feedback delays, discussed above.

Although the present disclosure has been described with reference to preferred embodiments, workers skilled in the art will recognize that changes may be made in form and detail without departing from the spirit and scope of the disclosure.

The invention claimed is:

1. A method for printing a three-dimensional part with an additive manufacturing system, the method comprising:
providing a bitslice stack having a plurality of bitslices;
printing a plurality of successive layers of the three-dimensional part with the additive manufacturing system based on the bitslice stack;
measuring surface heights of a first printed layer to obtain a composite image comprising a plurality of pixels;

obtaining predicted stack heights for a bitslice of the plurality of bitslices corresponding to the first printed layer;

utilizing the controller to determine differences between the measured surface heights and the predicted stack heights for each of the plurality of pixels;

utilizing the controller to identify one or more topographical error regions based on the determined differences including comparing the determined differences to a threshold value, wherein the one or more topographical error regions comprise one or more underfilled regions, one or more overfilled regions, or combinations thereof; and utilizing the controller to modify the bitslice stack to compensate for the one or more topographical error regions.

2. The method of claim 1, wherein printing the plurality of successive layers of the three-dimensional part comprises:

developing a plurality of successive layers with one or more electrophotography engines of the additive manufacturing system; and transfusing the successive developed layers with a layer transfusion assembly to produce the printed layers.

3. The method of claim 2, wherein one or more of the successive layers are developed with the one or more electrophotography engines between when the first printed layer is developed and when the surface heights of the first printed layer are measured to create a multiple-layer feedback delay, and wherein the bitslice stack is modified in part based on the multiple-layer feedback delay.

4. The method of claim 1, wherein measuring surface heights of the first printed layer comprises optically measuring the surface heights.

5. The method of claim 4, wherein optically measuring the surface heights comprises optically scanning the first printed layer with a line scanner.

6. The method of claim 1, wherein the threshold value is equal to about a thickness of the bitslice.

7. The method of claim 1, wherein the one or more topographical error regions comprise the one or more underfilled regions, and wherein modifying the bitslice stack comprises:

generating one or more additional bitslices to compensate for the one or more underfilled regions; and introducing the one or more additional bitslices into a frame sequence of the bitslice stack prior to a next pending bitslice of the bitslice stack.

8. The method of claim 1, wherein the one or more topographical error regions comprise the one or more overfilled regions, and wherein modifying the bitslice stack comprises modifying one or more pending bitslices in the bitslice stack to compensate for the one or more overfilled regions.

9. A method for printing a three-dimensional part with an additive manufacturing system, the method comprising:

providing a bitslice stack having a plurality of bitslices;

developing a first layer with one or more electrophotography engines of the additive manufacturing system based on a first bitslice of the plurality of bitslices;

transfusing the developed first layer to a previous layer of the three-dimensional part;

measuring surface heights of the transfused first layer to obtain a composite image comprising a plurality of pixels, wherein one or more additional layers are developed with the one or more imaging engines prior to measuring the surface heights of the transfused first layer to provide a multiple-layer feedback delay;

obtaining predicted stack heights of a first bitslice of the plurality of bitslices, the first bitslice corresponding to the transfused first layer;

utilizing the controller to determine differences between the measured surface heights and the predicted stack heights of the first bitslice for each of the plurality of pixels; and utilizing the controller to modify the bitslice stack based on the determined differences and the multiple-layer feedback delay.

10. The method of claim 9, wherein measuring the surface heights of the transfused first layer comprises optically measuring the surface heights.

11. The method of claim 9, and further comprising identifying one or more topographical error regions based on the determined differences, wherein the one or more topographical error regions comprise one or more underfilled regions, one or more overfilled regions, or combinations thereof, and wherein modifying the bitslice stack based on the determined differences comprises modifying the bitslice stack to compensate for the one or more topographical error regions.

12. The method of claim 11, wherein identifying the one or more topographical error regions based on the determined differences comprises comparing the determined differences to a threshold value that is equal to about a thickness of the first bitslice.

13. The method of claim 11, wherein the one or more topographical error regions comprise the one or more underfilled regions, and wherein modifying the bitslice stack comprises:

utilizing the controller to generate one or more additional bitslices to compensate for the one or more underfilled regions; and utilizing the controller to introduce the one or more additional bitslices into a frame sequence of the bitslice stack prior to a next pending bitslice of the bitslice stack.

14. The method of claim 11, wherein the one or more topographical error regions comprise the one or more overfilled regions, and wherein modifying the bitslice stack comprises modifying one or more pending bitslices in the bitslice stack to compensate for the one or more overfilled regions.

* * * * *